United States Patent
Mackay

(10) Patent No.: US 9,475,359 B2
(45) Date of Patent: Oct. 25, 2016

(54) SYSTEMS AND METHODS FOR DISPLAYING A HIERARCHICAL SET OF BUILDING MANAGEMENT SYSTEM INFORMATION

(75) Inventor: Douglas P. Mackay, Los Angeles, CA (US)

(73) Assignee: Johnson Controls Technology Company, Plymouth, MI (US)

(*) Notice: Subject to any disclaimer, the term of this patent is extended or adjusted under 35 U.S.C. 154(b) by 614 days.

(21) Appl. No.: 12/898,599

(22) Filed: Oct. 5, 2010

(65) Prior Publication Data

US 2011/0088000 A1    Apr. 14, 2011

Related U.S. Application Data

(60) Provisional application No. 61/249,187, filed on Oct. 6, 2009.

(51) Int. Cl.

| | |
|---|---|
| *G06F 3/048* | (2013.01) |
| *B60H 1/00* | (2006.01) |
| *F24F 11/00* | (2006.01) |
| *H04L 12/28* | (2006.01) |
| *G06Q 50/16* | (2012.01) |
| *G06T 19/00* | (2011.01) |

(52) U.S. Cl.
CPC ......... *B60H 1/00642* (2013.01); *F24F 11/001* (2013.01); *G06Q 50/16* (2013.01); *G06T 19/00* (2013.01); *H04L 12/2823* (2013.01)

(58) Field of Classification Search
CPC . F24F 2011/0091; F24F 11/001; G06F 8/34; G06F 11/3065; G06F 11/3003; G06F 11/3055; G06F 33/3058; G06F 11/32; G06Q 50/163; B60H 1/00021; B60H 1/00642; H04L 12/26; H04L 12/2823
USPC .......................................................... 715/853
See application file for complete search history.

(56) References Cited

U.S. PATENT DOCUMENTS

| | | |
|---|---|---|
| 4,872,397 A | 10/1989 | Demeter et al. |
| 5,061,916 A | 10/1991 | French et al. |
| 5,117,900 A | 6/1992 | Cox |
| 5,261,044 A * | 11/1993 | Dev et al. ..................... 715/855 |
| 5,297,252 A * | 3/1994 | Becker .......................... 715/803 |
| 5,809,265 A * | 9/1998 | Blair et al. ..................... 715/764 |
| 5,987,469 A * | 11/1999 | Lewis et al. |
| 6,157,943 A | 12/2000 | Meyer |
| 6,167,316 A | 12/2000 | Gloudeman et al. |

(Continued)

FOREIGN PATENT DOCUMENTS

WO     WO 02/21259     3/2002

OTHER PUBLICATIONS

Murphy, John, "Temperature & Humidity Control in Surgery Rooms," Jun. 2006, ASHRAE Journal, vol. 48.*

(Continued)

*Primary Examiner* — Alvin Tan
(74) *Attorney, Agent, or Firm* — Foley & Lardner LLP

(57) ABSTRACT

A computing system for displaying hierarchical set of building management system information is shown and described. The computing system includes a processing circuit configured to render a shape for each software defined building object and to render the shapes for lower level software defined building objects as nested within the shapes for the higher level software defined building objects.

17 Claims, 13 Drawing Sheets

(56) References Cited

U.S. PATENT DOCUMENTS

| | | | |
|---|---|---|---|
| 6,332,163 B1 | 12/2001 | Bowman-Amuah | |
| 6,366,832 B2 | 4/2002 | Lomonaco et al. | |
| 6,405,103 B1 | 6/2002 | Ryan et al. | |
| 6,487,457 B1 | 11/2002 | Hull et al. | |
| 6,628,304 B2* | 9/2003 | Mitchell et al. | 715/734 |
| 6,687,698 B1 | 2/2004 | Nixon et al. | |
| 6,772,216 B1 | 8/2004 | Ankireddipally et al. | |
| 6,788,980 B1 | 9/2004 | Johnson | |
| 6,839,601 B1 | 1/2005 | Yazback et al. | |
| 6,842,776 B1 | 1/2005 | Poisner | |
| 6,845,396 B1 | 1/2005 | Kanojia et al. | |
| 6,862,589 B2 | 3/2005 | Grant | |
| 6,895,513 B1 | 5/2005 | Balasubramaniam et al. | |
| 7,000,238 B2 | 2/2006 | Nadler et al. | |
| 7,017,162 B2 | 3/2006 | Smith et al. | |
| 7,039,591 B2 | 5/2006 | Ecklund et al. | |
| 7,117,504 B2 | 10/2006 | Smith et al. | |
| 7,151,966 B1 | 12/2006 | Baier et al. | |
| 7,152,090 B2 | 12/2006 | Amirisetty et al. | |
| 7,159,007 B2 | 1/2007 | Stawikowski | |
| 7,162,534 B2 | 1/2007 | Schleiss et al. | |
| 7,165,087 B1 | 1/2007 | Graupner et al. | |
| 7,219,154 B2 | 5/2007 | Blakley, III et al. | |
| 7,254,607 B2 | 8/2007 | Hubbard et al. | |
| 7,266,600 B2 | 9/2007 | Fletcher et al. | |
| 7,293,010 B2 | 11/2007 | Angele et al. | |
| 7,295,984 B2 | 11/2007 | Glynn | |
| 7,330,473 B1 | 2/2008 | Baier et al. | |
| 7,340,714 B2 | 3/2008 | Upton | |
| 7,343,428 B2 | 3/2008 | Fletcher et al. | |
| 7,350,184 B2 | 3/2008 | Upton | |
| 7,356,694 B2 | 4/2008 | Mayo et al. | |
| 7,373,410 B2 | 5/2008 | Monza et al. | |
| 7,376,959 B2 | 5/2008 | Warshavsky et al. | |
| 7,378,969 B2* | 5/2008 | Chan et al. | 340/572.4 |
| 7,392,391 B2 | 6/2008 | Eibach et al. | |
| 7,398,307 B2 | 7/2008 | Dorland | |
| 7,406,982 B2 | 8/2008 | Pfaff et al. | |
| 7,461,039 B1 | 12/2008 | Gilman | |
| 7,634,555 B1 | 12/2009 | Wainscott, Jr. et al. | |
| 7,680,546 B2* | 3/2010 | Gilbert et al. | 700/17 |
| 7,954,070 B2* | 5/2011 | Plocher et al. | 715/854 |
| 8,290,627 B2* | 10/2012 | Richards et al. | 700/276 |
| 2002/0023091 A1 | 2/2002 | Silberberg et al. | |
| 2002/0059425 A1 | 5/2002 | Belfiore et al. | |
| 2002/0174178 A1 | 11/2002 | Stawikowski | |
| 2003/0023712 A1* | 1/2003 | Zhao et al. | 709/223 |
| 2003/0028577 A1 | 2/2003 | Dorland et al. | |
| 2003/0033376 A1 | 2/2003 | Brownhill et al. | |
| 2003/0101170 A1 | 5/2003 | Edelstein et al. | |
| 2003/0120665 A1 | 6/2003 | Fox et al. | |
| 2003/0163450 A1 | 8/2003 | Borenstein et al. | |
| 2003/0163597 A1 | 8/2003 | Hellman et al. | |
| 2003/0177481 A1 | 9/2003 | Amaru et al. | |
| 2003/0179228 A1 | 9/2003 | Schreiber et al. | |
| 2004/0030739 A1 | 2/2004 | Yousefi'zadeh | |
| 2004/0081183 A1 | 4/2004 | Monza et al. | |
| 2004/0093331 A1 | 5/2004 | Garner et al. | |
| 2004/0093344 A1 | 5/2004 | Berger et al. | |
| 2004/0093559 A1 | 5/2004 | Amaru et al. | |
| 2004/0098401 A1 | 5/2004 | Angele | |
| 2004/0105424 A1 | 6/2004 | Skoczkowski et al. | |
| 2004/0216030 A1 | 10/2004 | Hellman et al. | |
| 2004/0216147 A1 | 10/2004 | Yanosy et al. | |
| 2004/0218591 A1 | 11/2004 | Ogawa et al. | |
| 2004/0225629 A1 | 11/2004 | Eder | |
| 2004/0267567 A1 | 12/2004 | Barrera et al. | |
| 2005/0044197 A1 | 2/2005 | Lai | |
| 2005/0086360 A1 | 4/2005 | Mamou et al. | |
| 2005/0198255 A1 | 9/2005 | Wainscott, Jr. et al. | |
| 2006/0064468 A1 | 3/2006 | Brown et al. | |
| 2006/0070082 A1 | 3/2006 | Sridhar et al. | |
| 2006/0074980 A1 | 4/2006 | Sarkar | |
| 2006/0106473 A1 | 5/2006 | Enright et al. | |
| 2006/0161544 A1 | 7/2006 | Lee et al. | |
| 2006/0168178 A1 | 7/2006 | Hwang et al. | |
| 2007/0043687 A1 | 2/2007 | Bodart et al. | |
| 2007/0100981 A1 | 5/2007 | Adamczyk et al. | |
| 2007/0156498 A1 | 7/2007 | Zwerger et al. | |
| 2007/0185759 A1 | 8/2007 | Kataria et al. | |
| 2007/0236346 A1 | 10/2007 | Helal et al. | |
| 2008/0009959 A1 | 1/2008 | Enright et al. | |
| 2008/0028068 A1 | 1/2008 | Nochta et al. | |
| 2008/0059559 A1 | 3/2008 | Gathman et al. | |
| 2011/0087977 A1* | 4/2011 | Campney et al. | 715/763 |
| 2011/0252327 A1* | 10/2011 | Awasthi et al. | 715/736 |

OTHER PUBLICATIONS

OPC ™ Foundation, "OPC XML-DA Specification," Version 1.0, Jul. 12, 2003, 100 pages.

* cited by examiner

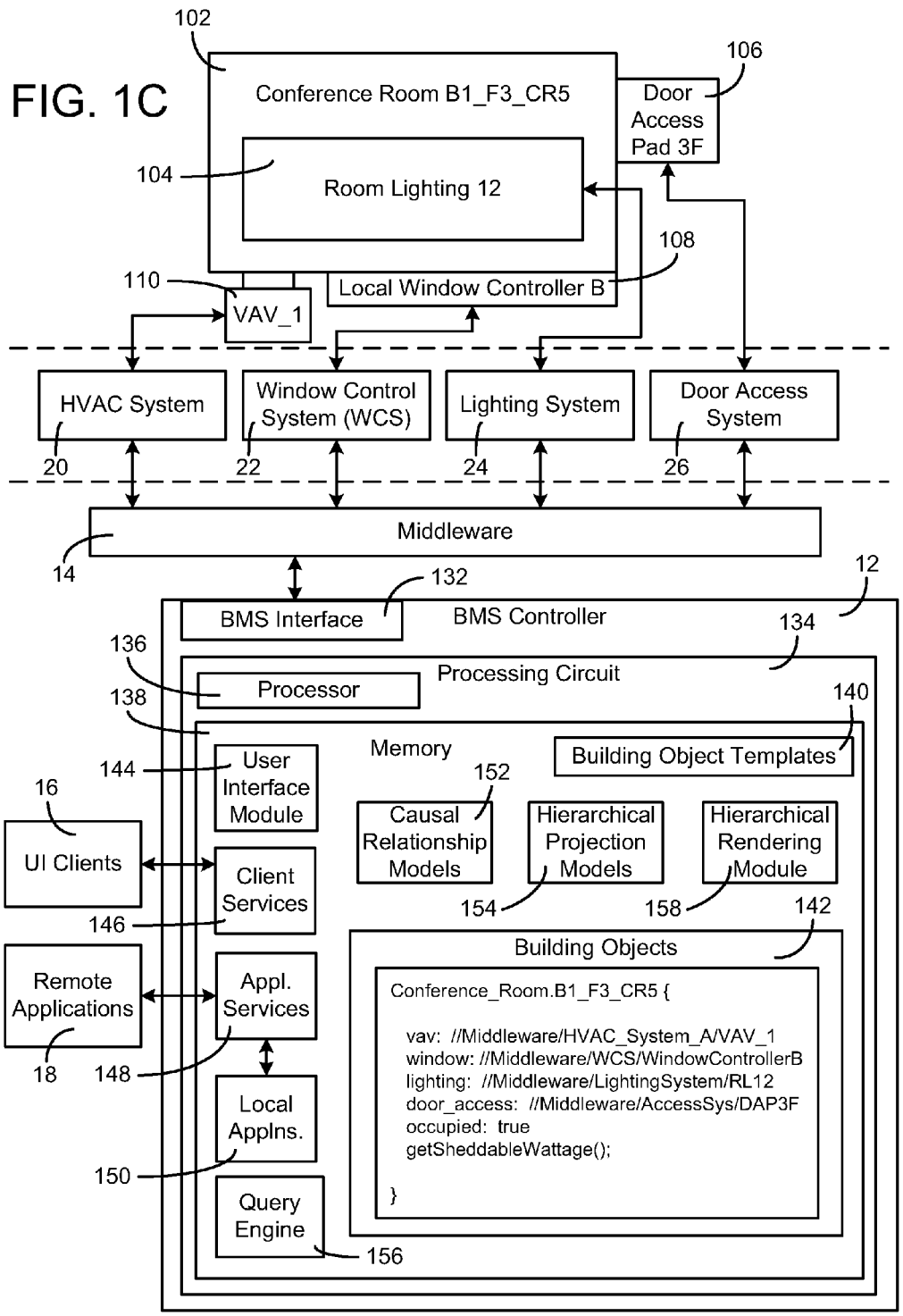

SYSTEMS AND METHODS FOR DISPLAYING A HIERARCHICAL SET OF BUILDING MANAGEMENT SYSTEM INFORMATION

CROSS-REFERENCE TO RELATED APPLICATIONS

The present application claims the benefit of U.S. Provisional Application No. 61/249,187, filed Oct. 6, 2009, the entirety of which is hereby incorporated by reference.

BACKGROUND

The present invention relates generally to the field of building management systems.

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include METASYS building controllers or other devices sold by Johnson Controls, Inc., as well as building devices and components from other sources.

A BMS may include one or more computer systems (e.g., servers, BMS controllers, etc.) that serve as enterprise level controllers, application or data servers, head nodes, master controllers, or field controllers for the BMS. Such computer systems may communicate with multiple downstream building systems or subsystems (e.g., an HVAC system, a security system, etc.) according to like or disparate protocols (e.g., LON, BACnet, etc.). The computer systems may also provide one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the BMS, its subsystems, and devices.

SUMMARY

One embodiment of the invention relates to a computerized method for displaying a hierarchical set of building management system (BMS) information. Each level of the hierarchical set of BMS information may include at least one software defined building object. The method includes rendering a shape for each software defined building object. The method also includes rendering the shapes for lower level software defined building objects as nested within the shapes for the higher level software defined building objects. The method further includes causing the display of the rendered and nested shapes on a graphical user interface shown on an electronic display system. Each shape may be displayed with indicia relating to software defined building object associated with each shape.

Another embodiment of the invention relates to a computer system for displaying a hierarchical set of building management system (BMS) information. Each level of the hierarchical set of BMS information may include at least one software defined building object. The computer system includes a processing circuit configured to render a shape for each software defined building object and to render the shapes for lower level software defined building objects as nested within the shapes for the higher level software defined building objects. The processing circuit is also configured to cause the display of the rendered and nested shapes on a graphical user interface shown on an electronic display system.

Yet another embodiment of the invention relates to computer readable media with computer-executable instructions embodied thereon that, when executed by a computing system, perform a method for displaying a hierarchical set of building management system (BMS) information. Each level of the hierarchical set of BMS information may include at least one software defined building object. The media includes instructions for rendering a shape for each software defined building object. The media also includes instructions for rendering the shapes for lower level software defined building objects as nested within the shapes for the higher level software defined building objects. The media further includes instructions for causing the display of the rendered and nested shapes on a graphical user interface shown on an electronic display system. Each shape may be displayed with indicia for the software defined building object associated with each shape.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which:

FIGS. 1C-D are detailed block diagrams of a portion of the BMS shown in FIG. 1B, according to an exemplary embodiment;

DETAILED DESCRIPTION

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Embodiments of the present disclosure include a computer system for a BMS (e.g., a BMS controller) that has been configured to help make differences in building subsystems transparent at the human-machine interface, application, or client interface level. The computer system is configured to provide access to different building devices and building subsystems using common or unified building objects (e.g., software objects stored in memory) to provide the transparency. In an exemplary embodiment, a software defined building object (e.g., "virtual building object", "virtual device") groups multiple properties from disparate building systems and devices into a single software object that is stored in memory and provided by a computer system for interaction with other systems or applications (e.g., front-end applications, control applications, remote applications, client applications, local processes, etc.). Multiple software defined building objects may be described as forming an abstraction layer of a BMS software framework or architecture. Benefits such as allowing developers to write applications that will work regardless of a particular building subsystem makeup (e.g., particular naming conventions, particular protocols, etc.) may be provided by such software defined building objects. Such software defined building objects are further described in Ser. No. 12/887,390, filed Sep. 21, 2010 to Huneycutt et al. application Ser. No. 12/887,390 is hereby incorporated by reference in its entirety.

Figure 1A:
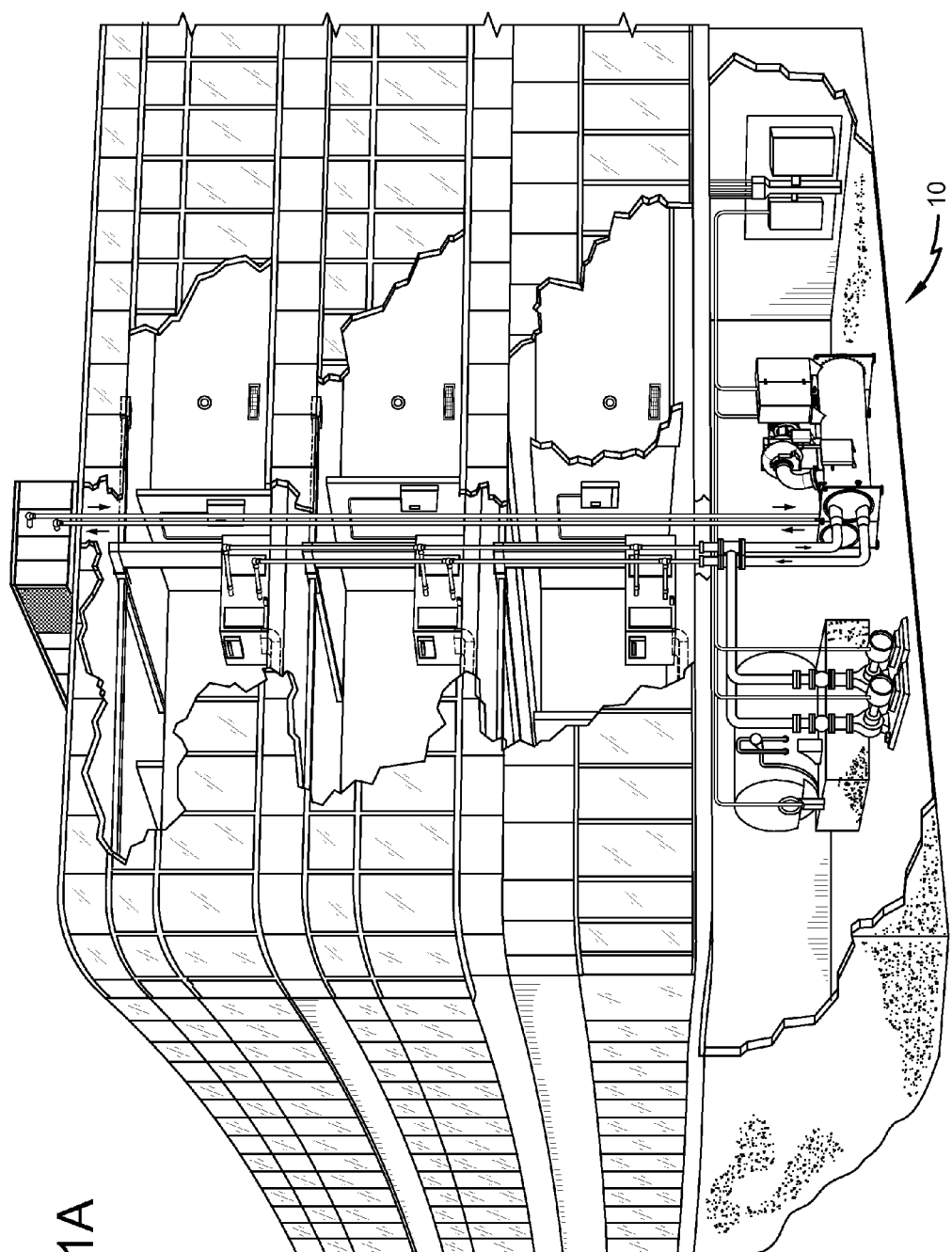
FIG. 1A is a perspective view of a building including a BMS, according to an exemplary embodiment.

Referring now to FIG. 1A, a perspective view of a building 10 is shown, according to an exemplary embodiment. A BMS serves building 10. The BMS for building 10 may include any number or type of devices that serve the building. For example, each floor may include one or more security devices, video surveillance cameras, fire detectors, smoke detectors, lighting systems, HVAC systems, or other building systems or devices. In modern BMSs, BMS devices can exist on different networks within the building (e.g., one or more wireless networks, one or more wired networks, etc.) and yet serve the same building space or control loop. For example, devices may be connected to different communications networks or field controllers even if the devices serve the same area (e.g., floor, conference room, building zone, tenant area, etc.) or equipment.

Figure 1B:
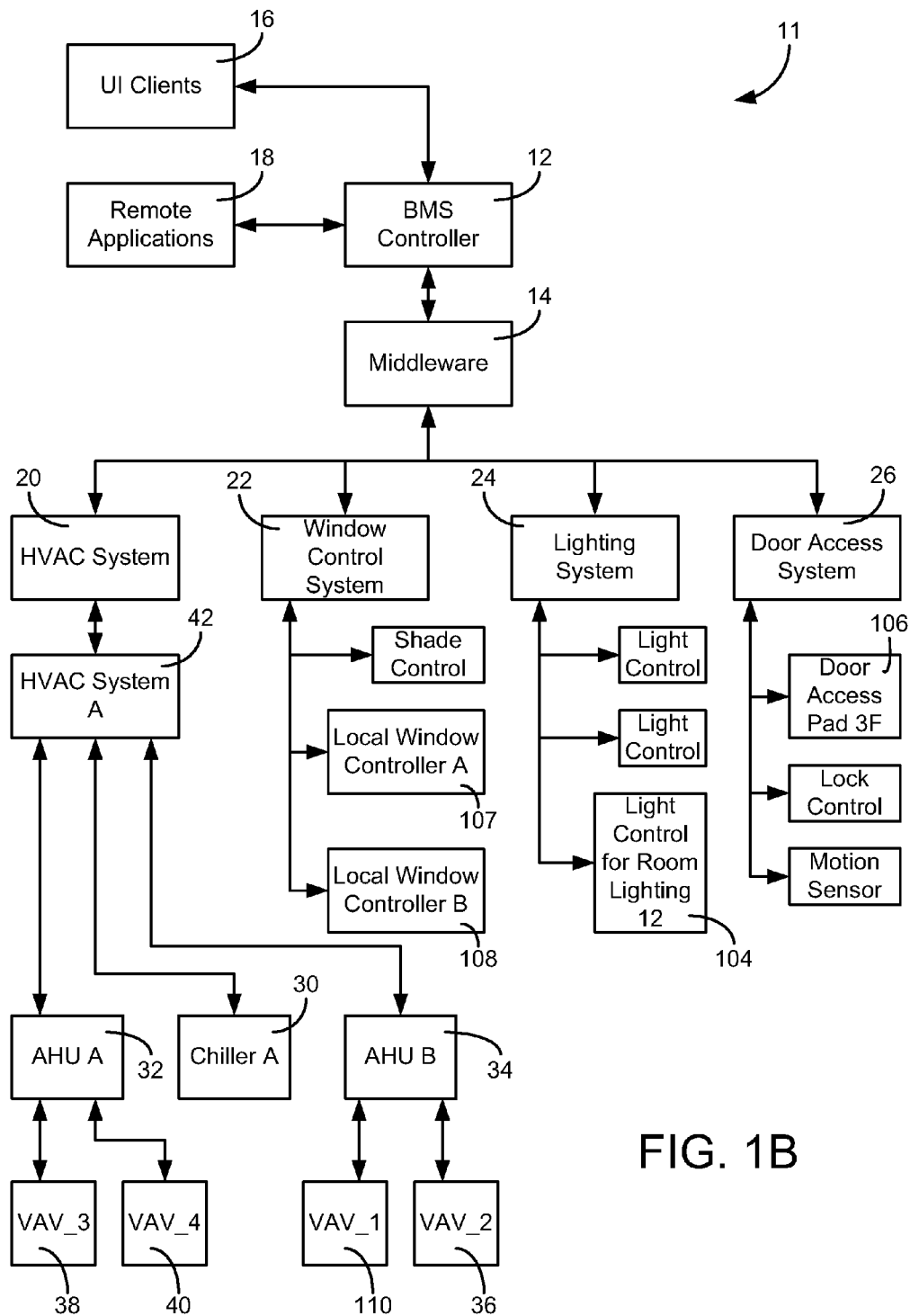
FIG. 1B is a block diagram of the BMS for the building of FIG. 1A, according to an exemplary embodiment.

Referring now to FIG. 1B, a block diagram of an exemplary BMS 11 for building 10 of FIG. 1A is shown, according to an exemplary embodiment. BMS 11 is shown to include a plurality of BMS subsystems 20-26. Each BMS subsystem 20-26 is connected to a plurality of BMS devices and makes data points for varying connected devices available to upstream BMS controller 12. Additionally, BMS subsystems 20-26 may encompass other lower-level subsystems. For example, an HVAC system may be broken down further as "HVAC system A," "HVAC system B," etc. In some buildings, multiple HVAC systems or subsystems may exist in parallel and may not be a part of the same HVAC system 20.

As illustrated in FIG. 1B, a BMS subsystem includes HVAC system 20. HVAC system 20 is shown to include a lower-level HVAC system 42, named "HVAC system A." For example, HVAC system 20 may control HVAC operations for a given building (e.g., building 10), while "HVAC system A" 42 controls HVAC operations for a specific floor of that building. "HVAC system A" 42 is connected to air handling units (AHUs) 32, 34, named "AHU A" and "AHU B" in the BMS, respectively. AHU 32 may control variable air volume (VAV) boxes 38, 40, named "VAV_3" and "VAV_4" in the BMS. Likewise, AHU 34 may control VAV boxes 36 and 110, named "VAV_2" and "VAV_1." HVAC system 42 may also include chiller 30, named "Chiller A" in the BMS. Chiller 30 may provide chilled fluid to AHU 32 and/or to AHU 34.

HVAC system 42 may also receive data from AHUs 32, 34 (e.g., a temperature setpoint, a damper position, temperature sensor readings). HVAC system 42 may then provide such BMS inputs up to HVAC system 20 and on to middleware 14 and BMS controller 12. Similarly, other BMS subsystems may receive inputs from other building devices or objects and provide them to middleware 14 and BMS controller 12 (e.g., via middleware 14). For example, a window control system 22 may receive shade control information from one or more shade controls, may receive ambient light level information from one or more light sensors, or may receive other BMS inputs (e.g., sensor information, setpoint information, current state information, etc.) from downstream devices. Window control system 22 may include window controllers 107, 108, named "local window controller A" and "local window controller B" in the BMS, respectively. Window controllers 107, 108 control the operation of subsets of the window control system 22. For example, window controller 108 may control window blind or shade operations for a given room, floor, or building in the BMS. Lighting system 24 may receive lighting related information from a plurality of downstream light controls, for example, from room lighting 104. Door access system 26 may receive lock control, motion, state, or other door related information from a plurality of downstream door controls. Door access system 26 is shown to include door access pad 106, named "Door Access Pad 3F" which may grant or deny access to a building space (e.g., floor, conference room, office, etc.) based on whether valid user credentials are scanned or entered (e.g., via a keypad, via a badge-scanning pad, etc.).

BMS subsystems 20-26 are shown as connected to BMS controller 12 via middleware 14 and are configured to provide BMS controller 12 with BMS inputs from the various BMS subsystems 20-26 and their varying downstream devices. BMS controller 12 is configured to make differences in building subsystems transparent at the human-machine interface or client interface level (e.g., for connected or hosted user interface (UI) clients 16, remote applications 18, etc.). BMS controller 12 is configured to describe or model different building devices and building subsystems using common or unified building objects (e.g., software objects stored in memory) to provide the transparency. Benefits such as allowing developers to write applications that will work regardless of the building subsystem makeup may be provided by such software building objects.

Figure 1D:
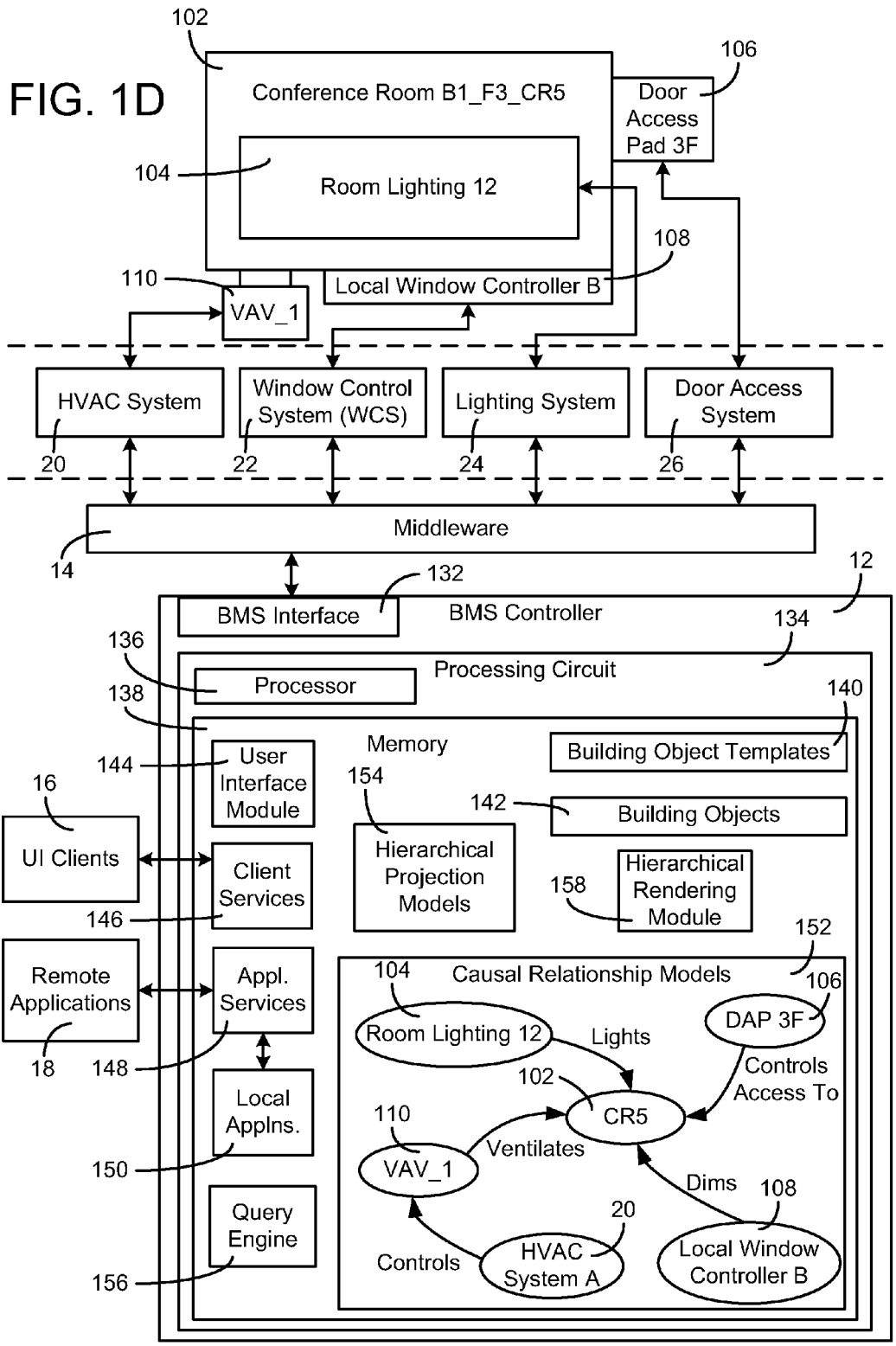

FIGS. 1C-D are detailed block diagrams of a portion of the BMS as shown in FIG. 1B, according to an exemplary embodiment. Many different building devices connected to many different BMS subsystems are shown to affect conference room "B1_F3_CR5." For example, conference room 102 includes or is otherwise affected by VAV box 110, window controller 108 (e.g., a blind controller), a system of lights 104 named "Room Lighting 12," and door access pad 106. As is viewable in FIGS. 1C-D and also in FIG. 1B, VAV box 110, window controller 108, lights 104, and door access pad 106 are not otherwise related. Each of the building devices shown at the top of FIGS. 1C-D may include local control circuitry configured to provide signals to their supervisory controllers or more generally to the BMS subsystems 20-26. The local control circuitry of the building devices shown at the top of FIGS. 1C-D may also be configured to receive and respond to control signals, commands, setpoints, or other data from their supervisory controllers. The local control circuitry of VAV box 110 may include circuitry that affects an actuator in response to control signals received from a field controller that is a part of HVAC system 20. Window controller 108 may include circuitry that affects windows or blinds in response to control signals received from a field controller that is part of window control system (WCS) 22. "Room Lighting 12" 104 may include circuitry that affects the lighting in response to control signals received from a field controller that is part of lighting system 24. Access pad 106 may include circuitry that affects door access (e.g., locking or unlocking the door) in response to control signals received from a field controller that is part of door access system 26.

In conventional buildings, the subsystems are typically managed separately. Even in BMSs where a unified graphical user interface is provided, a user must typically click through a hierarchy such as is shown in FIG. 1B to view data points for a lower level device or to make changes (e.g., setpoint adjustments, etc.). Such separate management can be particularly true if the subsystems are from different manufacturers or communicate according to different protocols. Conventional control software in such buildings is sometimes custom written to account for the particular differences in subsystems, protocols, and the like. Custom conversions and accompanying software is time consuming and expensive for end users or their consultants to develop. A software defined building object of the present disclosure is intended to group otherwise ungrouped or unassociated devices so that the group may be addressed or handled by applications together and in a consistent manner.

In an exemplary BMS controller, a conference room building object may be created in memory for each conference room in the building. Further, each conference room building object may include the same attribute, property, and/or method names as those shown in FIGS. 1C-D. For example, each conference room may include a variable air volume box attribute, a window attribute, a lighting attribute, and a door access device attribute. Such an architecture and collection of building objects is intended to allow developers to create common code for use in buildings regardless of the type, protocol, or configuration of the underlying BMS subsystems. For example, a single automated control application may be developed to restrict ventilation to conference rooms when the conference rooms are not in use (e.g., when the occupied attribute is equal to "true"). Assuming proper middleware and communications systems, the setup or the installation of a different BMS device or an application for a different BMS may not need to involve a re-write of the application code. Instead, for example, if a new building area is designated as a conference room, a new conference room building object can be created and set-up (e.g., a variable air volume unit mapped to the conference room building object). Once a new conference room building object is created and set-up, code written for controlling or monitoring conference rooms can interact with the new conference room (and its actual BMS devices) without modification.

Referring still to FIG. 1C-D, the BMS is shown to include a BMS interface 132 in communication with middleware 14 of the BMS. Middleware 14 is generally a set of services that allow interoperable communication to, from, or between disparate BMS subsystems 20-26 of the BMS (e.g., HVAC systems from different manufacturers, HVAC systems that communicate according to different protocols, security/fire systems, IT resources, door access systems, etc.). Middleware 14 may be, for example, an EnNet server sold by Johnson Controls, Inc. While middleware 14 is shown as separate from BMS controller 12, in various exemplary embodiments middleware 14 and BMS controller 12 are integrated. For example, middleware 14 may be a part of BMS controller 12.

BMS interface 132 (e.g., a communications interface) can be or include wired or wireless interfaces (e.g., jacks, antennas, transmitters, receivers, transceivers, wire terminals, etc.) for conducting data communications with another system or network. For example, BMS interface 132 can include an Ethernet card and port for sending and receiving data via an Ethernet-based communications network. In another example, BMS interface 132 includes a WiFi transceiver for communicating via a wireless communications network. BMS interface 132 may be configured to communicate via local area networks or wide area networks (e.g., the Internet, a building WAN, etc.). BMS interface 132 is configured to receive building management inputs from middleware 14 or directly from one or more BMS subsystems 20-26. BMS interface 132 can include any number of software buffers, queues, listeners, filters, translators, or other communications-supporting services.

BMS controller 12 is further shown to include a processing circuit 134 including a processor 136 and memory 138. Processor 136 may be a general purpose or specific purpose processor, an application specific integrated circuit (ASIC), one or more field programmable gate arrays (FPGAs), a group of processing components, or other suitable processing components. Processor 136 is configured to execute computer code or instructions stored in memory 138 or received from other computer readable media (e.g., CDROM, network storage, a remote server, etc.). According to an exemplary embodiment, memory 138 is communicably connected to processor 136 via electronics circuitry. Memory 138 (e.g., memory unit, memory device, storage device, etc.) is one or more devices for storing data and/or computer code for completing and/or facilitating the various processes described in the present disclosure. Memory 138 may be RAM, hard drive storage, temporary storage, non-volatile memory, flash memory, optical memory, or any other suitable memory for storing software objects and/or computer instructions. Memory 138 may include database components, object code components, script components, or any other type of information structure for supporting the various activities and information structures described in the present disclosure. Memory 138, for example, includes computer code for executing (e.g., by processor 136) one or more processes described herein. When processor 136 executes instructions stored in memory 138 for completing the various activities described herein, processor 136 generally configures BMS controller 12 and more particularly processing circuit 134 to complete such activities.

Memory 138 is shown to include building objects 142 and building object templates 140, which can be used to construct building objects of predefined types. For example, building object templates 140 may contain a "Conference Room" template that can be used to define conference room objects in building objects 142.

In FIG. 1C, software defined building object 142 named "Conference_Room.B1_F3_CR5" is illustrated as existing within memory 138 of BMS controller 12. To create a particular building object (for example, a software object of an air handling unit ("AHU")), inputs from building management resources may be mapped (e.g., linked, associated, described, grouped) to attributes of the particular building object. A simplified exemplary result of such mapping might be an object such as:

```
Floor1AHU {
    temperature_sensor: Floor1AHU.controllerB.TempS;
    setpoint: Floor1AHU.345server.Setpoint;
    damper_position: Floor1AHU.345server.Damper;
}
```

The building object's name is "Floor1AHU" which may conform to a naming convention indicating that it is the AHU serving the first floor of a building. The building object "Floor1AHU" has three values or attributes: temperature_sensor, setpoint, and damper_position that are mapped to the particular BMS resources of "Floor1AHU.345controllerB.TempS," "Floor1AHU.345server.Setpoint," and "Floor1AHU.345server.Damper," respectively. The mapping provides a description for BMS or computing resources (e.g., back end software applications or client applications) so that the BMS or computing resources can identify, access, display, change, or otherwise interact with the particular BMS resources mapped to "Floor1AHU" even when the resources are associated with different servers or controllers.

For example, BMS controller 12 may group inputs from the various subsystems 20-26 to create a building object "Conference_Room.B1_F3_CR5" including inputs from various systems controlling the environment in the room.

An exemplary software defined building object might be an object such as:

```
Conference_Room.B1_F3_CR5 {
    vav: //Middleware/HVAC_System_A/VAV_1;
    window: //Middleware/WCS/WindowControllerB;
    lighting: //Middleware/LightingSystem/RL12;
    door_access: //Middleware/AccessSys/DAP3F;
    occupied: true;
    getSheddableWattage( );
}
```

The software defined building object's name is "Conference_Room.B1_F3_CR5" which may conform to a naming convention indicating that it is a conference room in a particular location in the building, e.g. Conference Room 5 is on Floor 3 of Building 1. The building object "Conference_Room.B1_F3_CR5" has several values or attributes including: vav, window, lighting, door_access, occupied, and getSheddableWattage. The attributes of vav, window, lighting and door_access are mapped to the particular BMS resources of "HVAC_System_A/VAV_1," "WCS/WindowControllerB," "LightingSystem/RL12," and "AccessSys/DAP3F," respectively. The mapping provides a description for BMS or computing resources (e.g., back end software applications, client applications, BMS control routines, etc.) so that the BMS or other computing resources can identify, access, display, change or otherwise interact with the software defined building object in a meaningful way (e.g., in a way that allows changes to be made to the mapped devices). A software defined building object may be mapped to BMS inputs manually. For example, the mapping may be completed by a user with a graphical user interface tool that requires a user to either type in or "drag and drop" BMS inputs to an object. Software defined building objects may also or alternatively be mapped to BMS inputs by computerized systems configured to provide varying degrees of mapping automation. For example, patent application Ser. No. 12/887,390, filed Sep. 21, 2010 and incorporated herein by reference in its entirety, describes systems and methods for creating software defined building objects and mapping BMS inputs to the building objects. "Occupied" is a boolean property unique to the "Conference_Room.B1_F3_CR5" building object. GetSheddableWattage( ) is a method unique to the "Conference_Room.B1_F3_CR5" building object.

As an example of how a building object may be used by the system, all conference room building objects may have the same attributes as "Conference_Room.B1_F3_CR5" listed above. Once each of the conference rooms in building 10 are mapped to a software defined conference room building object, the rooms may be treated the same way in code existing in BMS controller 12, remote applications 18, or UI clients 16. Accordingly, an engineer writing software code for UI clients 16, remote applications 18 or BMS controller 12 can know that each conference room will have attributes listed above (e.g., VAV, window, lighting, door access, occupied, getSheddableWattage( )). Therefore, for example, rather than having to know an address for a particular variable air volume controller in a particular HVAC system, a given conference room's VAV controller may be available at the conference room's vav attribute.

The creation of a software defined building object may include three steps:
 1. defining a building object template;
 2. creating an instance of a building object based on the template; and
 3. mapping or binding building object properties or attributes to particular BMS devices or inputs.

As an example of the first step, a conference room template or class may be created (e.g., by a developer, by a rapid application development module, etc.) such as the following:

```
public class Conference_Room extends Device {
    def vav
    def window
    def lighting
    def door_access
    def occupied
    def getSheddableWattage( ) { ... }
}
```

In some embodiments, the building object template or class may be a Groovy/Java class configured to inherit a series of benefits such as the ability to extend existing devices.

An instance of the class may be created and named (for example "B1_F3_CR5"). The names can be descriptive, based on an automated routine configured to find building objects, manually applied, or otherwise.

The mapping or binding process maps disparate BMS devices or inputs to the instance of the building object.

Once the building objects are created and BMS devices or inputs are mapped to the building objects, software defined building objects may be used by applications (local, remote, client, etc.) with any suitable programming language or syntax. As an example of interaction with the software defined building object used in previous examples, the following exemplary piece of code is configured to load "B1_F3_CR5" as ConfRoom, print the result of the method getSheddableWattage for ConfRoom, and set the window parameter to "50" (which may be sent to WCS 22 or "Local Window Controller B" 108 via BMS interface 132 or middleware 14 shown in FIGS. 1C-D to cause the blinds to be 50 percent open) when the ConfRoom object is saved.

def ConfRoom=factory.load("Conference_Room.B1_F3_CR5")
      println ConfRoom.getSheddableWattage( );
      ConfRoom1.window=50
      factory.save(ConfRoom)

In an exemplary embodiment, application services 148 of BMS controller 12 shown in FIGS. 1C-D may be or include web services configured to allow remote applications 18 or local applications 150 to access building object templates 140, building objects 142, causal relationship models 152, hierarchical projection models 154, query engine 156, and hierarchical rendering module 158 directly or indirectly via a set of internet application programming interfaces. To support such interfaces, each software defined building object may include or be exposed to a toXML( ) method configured to describe the software defined building object using XML. In another exemplary embodiment, application services 148 allows remote applications 18 on other BMS controllers to communicate with BMS controller 12 over a network.

Conventional building systems do not include organizational models which link and describe building objects by causal relationships (e.g., "ontological models"). A key feature of an ontological model is the ability to define relationships between dissimilar object types. A conventional hierarchical model may have an HVAC server object and a "VAV box" that is a member of the HVAC server object due to its control connection. Such a hierarchical model allows objects to be handled in a hierarchical manner, but lacks the ability to interrelate objects that do not follow the chain of inheritance. Causal relationships or ontological models, however, allow dissimilar objects to be related, thereby adding layers of description, flexibility, and robustness to the system. For example, a "ventilates" causal relationship may be used to relate a VAV box object to a conference room object, even though VAV box objects and conference room objects are dissimilar. Memory 138 is shown to include causal relationship models 152, which store the causal relationships between objects in building objects 142.

In FIG. 1D, causal relationship models 152 is shown to include a causal relationship model for conference room 102 and a number of building objects (e.g. building objects 30, 32, 40, etc. associated with devices shown in FIG. 1B) that affect access to conference room 102 or the environment of conference room 102. The causal relationships from these building objects to conference room 102 are identified and mapped back to conference room 102. For example, VAV box 110 is shown linked to conference room 102 with a directional link described by the name or tag "ventilates." This link represent the causal relationship between VAV box 110 and conference room 102. More particularly, the link identifies the causal relationship between VAV box 110 and conference room 102 as one where VAV box 110 provides ventilation to conference room 102. VAV box 110 is affected by HVAC System 20 and so the corresponding causal relationship is shown as being directional from conference room 102 to VAV box 110 with "controls" describing the relationship. Similarly, room lighting 104 lights conference room 102, window controller 108 dims conference room 102, and access pad 106 controls access to conference room 102. As described above, conference room 102 is not a building device that is associated with any one particular controller or BMS subsystem. As a complement to the software defined building object for the conference room, the exemplary causal relationship information structure shown at the bottom of FIG. 1D provides a multi-level relationship map that more clearly represents the complex control environment of the actual conference room shown at the top of FIG. 1D. In addition to coding and software development advantages, the causal relationship models can provide new user interface views, more robust searching (e.g., "show me all VAV boxes that ventilate conference rooms"), new fault detection and diagnostics tools, and other advantages.

While causal relationship models of the present disclosure may be rendered or displayed as directed graphs, embodiments of the present disclosure may store causal relationship models 152 in memory 138 according to various suitable information structures for representing such a model in computer memory. For example, a relational database may be used in some embodiments. In other embodiments, a collection of XML files may be maintained to store the causal relationship models. In yet other embodiments, a file or files including other information structures may be maintained.

Figure 2A:
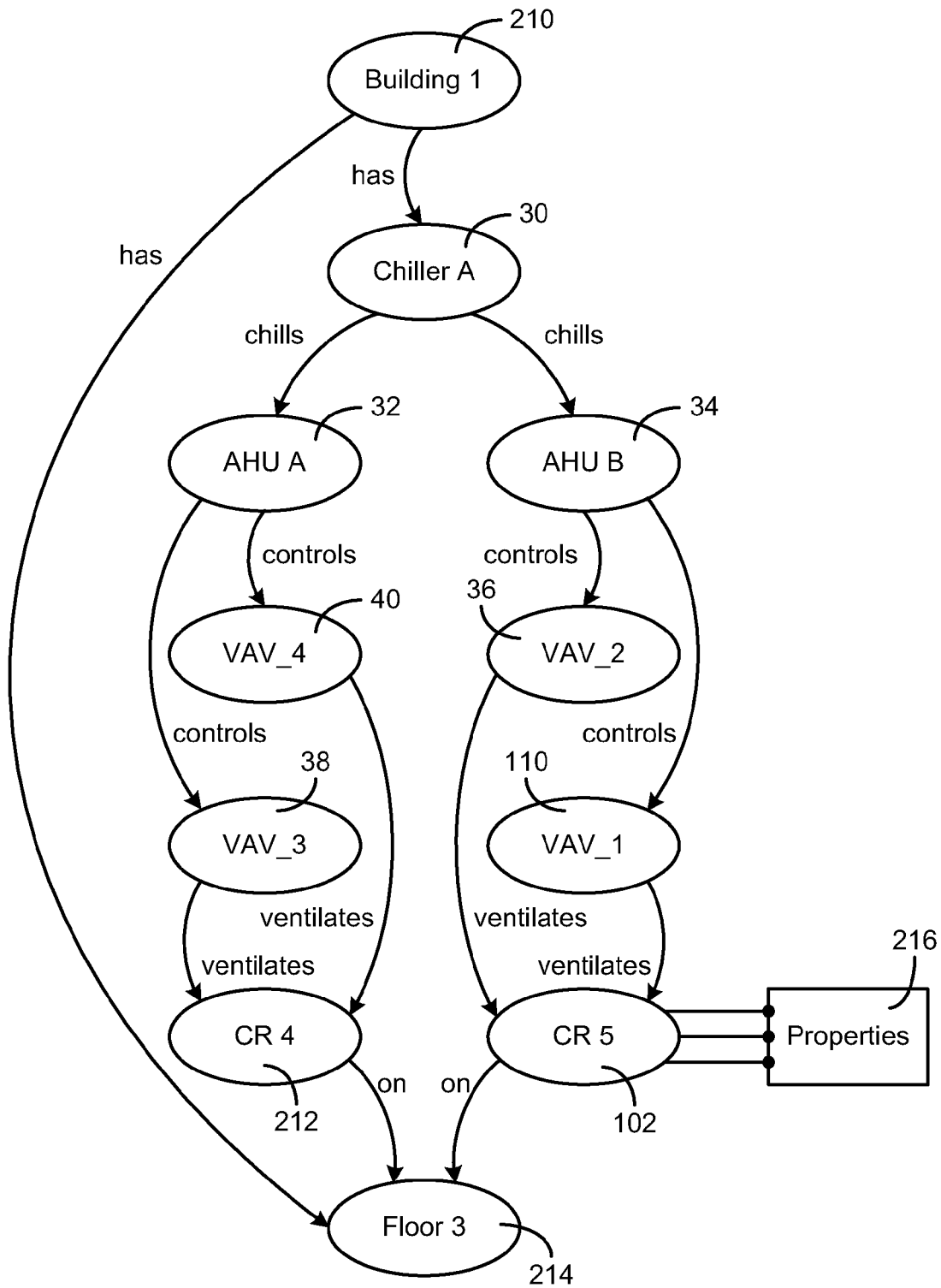
FIGS. 2A-B are diagrams of causal relationship models, according to an exemplary embodiment.
Figure 2B:
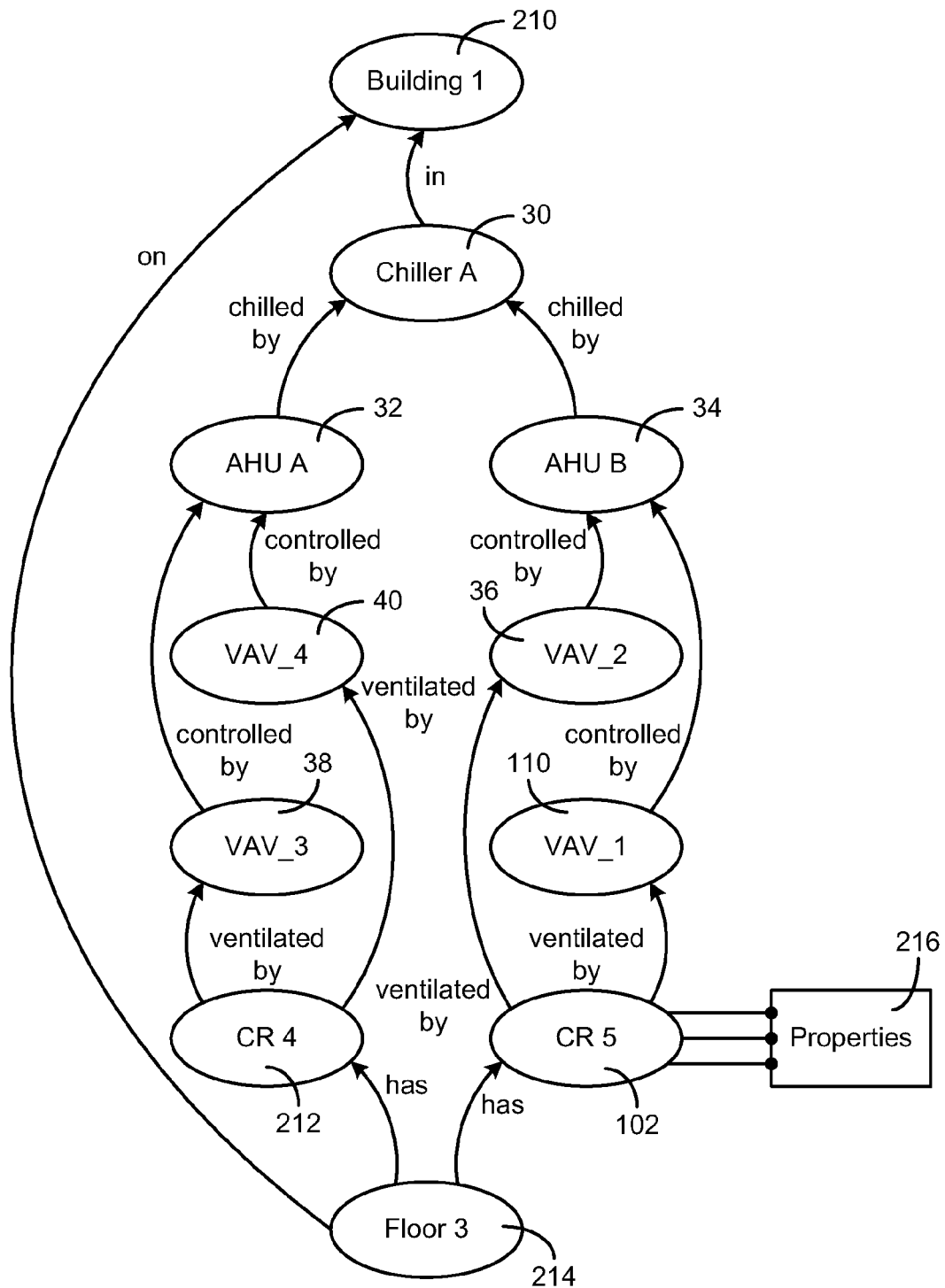

FIGS. 2A-B, illustrate two exemplary causal relationship models. In FIG. 2A, causal relationships are shown between various building objects 142. Building object 210, named "Building 1" in the BMS, has causal relationships with chiller 30 and floor 214, named "Floor 3." The causal relationship "has" is shown to link and define the relationships between building 210, floor 214 and chiller 30. Chiller 30, in turn, has causal relationships with AHUs 32, 34, i.e. it "chills" the air passing through AHUs 32, 34. AHU 32, in turn, has a causal relationship, "controls," with VAV boxes 38, 40. Similarly, AHU 34 has a causal relationship, "controls," with VAV boxes 36, 110. Likewise, VAV boxes 38, 40 have "ventilates" causal relationships with conference room 212, named "Conference Room 4" or "CR4" in the BMS. Similarly, VAV boxes 36, 110 have "ventilates" causal relationships with conference room 102, named "Conference Room 5" or "CR5" in the BMS. CR5 102 is shown to have properties 216, which can be created by default when a new conference room object is added to the BMS, or created by the BMS or a user when more information about the conference room becomes available. Finally, conference rooms 102, 212 are shown to have causal relationships with floor 214, denoting that both rooms are "on" floor 3. As is illustrated with conference room CR5, a software defined building object can be causally related with one or more actual devices (e.g., VAV_1) or with other software defined building objects (e.g., "Floor 3").

Causal relationship models may be stored in memory in any number of ways. In one embodiment, causal relationship models may be stored within one or more tables. For example, a table may have columns for a relationship type (e.g., a relationship description), a first object identifier, and a second object identifier. With reference to FIG. 2A, a row entry in such a table may include "has" in the relationship column, "Building 1" in the first object identifier column, and "Floor 3" in the second object identifier column. In this way, the causal relationship models 152 can be easily queried by relationship type, first object identifier and/or second object identifier. In another embodiment, a different table can be established for every type of causal relationship in the system. For example, a "controls" table may be established with a "source identifier" field and a "destination identifier" field. Referring to FIG. 2A, in a row for such a table "AHU B" would populate the "source identifier" field and "VAV_2" would populate the "destination identifier" field. In other embodiments, each software-defined building object may include a number of causal relationship properties or attributes that store the causal relationships. For example, a building object for "CR_4" shown in FIG. 2A might include a "ventilated by" property that is a delimited string of devices that ventilate CR_4 (e.g., ventilated by: VAV_3, VAV_4). Any number of suitable information structures for representing the causal relationship may be stored in memory.

FIG. 2B illustrates another exemplary causal relationship model for the building objects in FIG. 2A. In FIG. 2B, causal relationships between building objects are linked with causal relationships that have a directionality that is opposite to that shown in FIG. 2A. The causal relationship model of FIG. 2B may co-exist with the model shown in FIG. 2A. In other embodiments, only one of FIG. 2A and FIG. 2B will exist for a BMS. A set-up process may prompt a user for whether a "top-down" or "bottom-up" directionality is desired. In some embodiments the causal relationship model will be maintained and stored on a "bottom-up" basis such as that shown in FIG. 2B. In a system where the causal relationship models of FIG. 2A and FIG. 2B co-exist, FIG. 2A's causal relationship "has" that links building 210 to chiller 30 in FIG. 2A may have a corresponding causal relationship "in" that links chiller 30 to building 210 in FIG. 2B.

Causal relationship models such as those shown in FIGS. 2A-B may be created in different ways according to varying embodiments of the disclosure. In some embodiments, for example, a user may be prompted to create, or an automated system may create, a model with immediate references to particular building objects. In other embodiments, the system may prompt or otherwise allow a user to define causal relationship classes or templates of causal relationship models that will later be used and reused for particular instances of causal relationship models and objects.

In an exemplary embodiment, a specification of a class, class relationships, and properties can be defined generally as a template. For example, a template for an HVAC class may include default causal relations to equipment objects, such as VAV boxes, and to location objects, such as a floor or building. The representation of the class may be in the form of a directed graph (regardless of the underlying information structure) and not a conventional device tree form. Default properties or attributes may be established for one or more of the nodes. Instantiated objects can then be created or mapped using the relational template. The created causal relationship models may be modified at run-time or via a tool that allows modification outside of a run-time environment. For example, a tool may be provided for adding, modifying, or removing relationships, objects, classes, properties, attributes, and the like. When edits are made, the computing system or tool may be configured to dynamically adjust the model's structure (e.g., as the model is not stored as a static tree hierarchy). For example, if access pad 106 is no longer used to control access to conference room 102, the causal relationships pointing to access pad 106 may be deleted as well as its corresponding building object—but the rest of the model remains intact and unaffected. While the causal relationship models shown in FIGS. 2A-B primary relate to software defined objects for building devices, many different building object relationships may be modeled using the systems and methods of the present disclosure. For example, other building entities (e.g., departments, employees, etc.) may be mapped to the BMS devices or software objects thereof. Therefore, using the causal relationship approach, building devices and the BMS may be linked with other enterprise systems (e.g., an HR management system having employee objects).

Referring again to FIGS. 1C and 1D, memory 138 is also shown to include hierarchical projection models 154. While the models of the present disclosure are not stored or represented as static hierarchical models, systems and methods of the present disclosure are configured to allow the creation of multiple hierarchical views of the causal relationship model. Each "view" may be defined as a hierarchical model (e.g., tree model, uni-directional tree, top-down tree having a head node, etc.) in memory 138 to which a causal relationship model can be applied. In other words, one or more hierarchical models may be created in memory 138 and one or more causal relationships can be projected onto the one or more hierarchical models.

Memory 138 is also shown to include client services 146 configured to allow interaction between internal or external clients or applications and BMS controller 12. Client services 146, for example, may include web services or application programming interfaces available for communication by UI clients 16 and remote applications 18 (e.g., an energy monitoring application, an application allowing a user to monitor the performance of the BMS, an automated fault detection and diagnostics system, etc.).

Memory 138 further includes user interface module 144. User interface module 144 is configured to generate one or more user interfaces for receiving input from a user. User interface module 144 may be configured to provide, for example, a graphical user interface, a voice driven interface, a text-based interface, or another interface for receiving user input regarding the mapping of BMS inputs to building objects. In an exemplary embodiment, user interface module 144 is an HTML-based application configured to be served by, for example, client services 146 or another web server of BMS controller 12 or another device. User interface module 144 may be configured to prompt a user (e.g., visually, graphically, audibly, etc.) for input regarding building objects 142, building object templates 140, causal relationship models 152 or hierarchical projection models 154. In an exemplary embodiment, user interface module 144 prompts the user to create (or otherwise provides a user interface for creating) a template building object 140. User interface module 144 may also prompt the user to map BMS inputs to the template building object. User interface module 144 may receive and handle the user inputs to initiate the storage of received input mappings. In another exemplary embodiment, user interface module 144 may prompt the user to identify, define, store, modify or delete a causal relationship in causal relationship models 152. For example, a user may use a GUI to create a causal relationship between defined building objects in building objects 142, e.g. relating a conference room object to a VAV box object. User interface module 144 may further be configured to generate and serve graphical user interfaces having information displays of building objects and/or causal relationships. User interface module 144 may also be configured to utilize query engine 156 to query and retrieve information about causal relationships in causal relationship models 152 or via hierarchical projection models 154.

Figure 3:
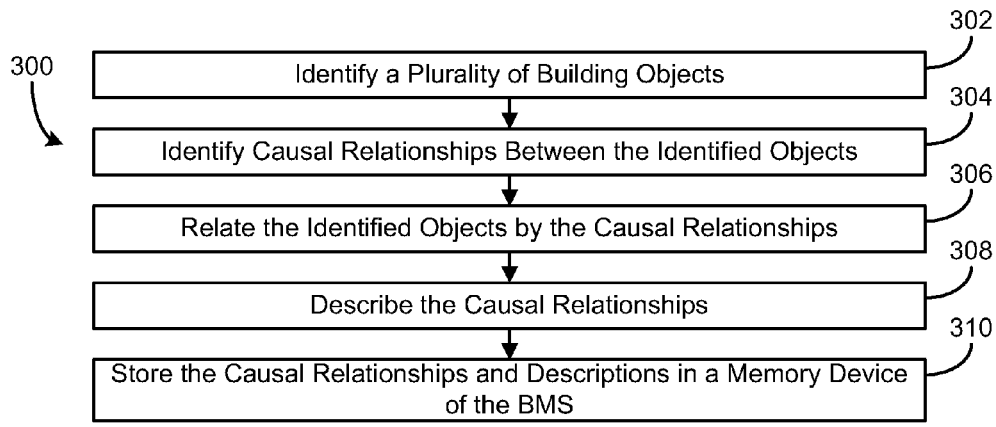
FIG. 3 is a flow diagram of a process for building a causal relationship model of the BMS, according to an exemplary embodiment.

Referring now to FIG. 3, a flow chart of a process 300 for organizing and using information in a building management system (BMS) is shown, according to an exemplary embodiment. Process 300 includes identifying a plurality of building objects (e.g., including building devices, software defined building objects, or other inputs to the BMS that affect the building environment) (step 302). Process 300 also includes identifying the causal relationships between the identified building objects (step 304). Steps 302, 304 may include testing building inputs and outputs for the causal relationships using an automated process. The identifying steps may also or alternatively include using an automated process to analyze characteristics of BMS devices and signals to create software defined building objects and their causal relationships to each other. In yet other exemplary embodiments, the identifying steps include causing a graphical user interface to be displayed that allows a user to input the building objects and the causal relationships between the objects.

Process 300 is further shown to include relating the identified objects by the causal relationships (step 306). Relating the identified objects by causal relationships may be completed by an automated process (e.g., based on testing, based on signal or name analysis at a commissioning phase, etc.) or by user configuration (e.g., of tables, of graphs via a graphical user interface, etc.). In an exemplary embodiment, a graphical user interface may be provided for allowing a user to draw directional links between building objects. Once a link is drawn, a computerized process may cause a dialog box to be shown on the GUI for allowing a user to describe the created causal relationship.

Process 300 is yet further shown to include describing the causal relationships (step 308). The description may be found and stored using any of the previously mentioned processes (e.g., automated via testing, manually input via a keyboard or other user input device, etc.). In one set of exemplary embodiments, the user is able to select (e.g., via a drop down box, via a toolbox, etc.) from a predefined list of possible causal relationship descriptions or to insert (e.g. type) a custom causal relationship description at a graphical user interface.

Process 300 is yet further shown to include storing the causal relationships and descriptions in a memory device of the BMS (step 310). The causal relationships may be stored using any of the above-described information structures (e.g., stored in tables, stored as lists linked to object properties, stored as a system of linked lists, etc.).

Referring again to FIGS. 1C-D, while the causal relationship models of the present disclosure may not be stored or represented as static hierarchical models (e.g., a tag-based hierarchical model description), systems and methods of the present disclosure are configured to allow the creation of multiple hierarchical views of the causal relationship models.

Each "view" may be defined as a hierarchical model (e.g., tree model) in memory to which one or more causal relationship models can be applied or projected. For example, at least two different hierarchical models may be used to describe the models of FIGS. 2A-B as shown below:

```
<Conference Room>
    <VAV Box>
        <AHU>
        <VAV Box/>
    <Conference Room/>
OR
    <AHU>
        <VAV Box>
```

```
<Conference Room/>
    <VAV Box/>
<AHU>
```

The first example shows a small hierarchical tree of building objects related to a conference room. For example, a conference room may be ventilated by a VAV box, which in turn is controlled by an AHU. In the second example, a similar tree is shown, but from the perspective of an AHU. The AHU may control a VAV box, which in turn ventilates a conference room. Any number or type of hierarchical models may be created and used to describe complex causal relationship models. In conventional systems, a building may only be described using a single static hierarchical tree (e.g., top down, one head node, showing control connections). The present invention allows the user or the system to establish many different new information structures by applying desired hierarchical models (e.g., bottom-up, top-down, selecting a new head node, etc.) to the stored causal relationship models. The hierarchical models may be used for reporting, displaying information to a user, for communication to another system or device (e.g., PDA, client interface, an electronic display, etc.), or for further searching or processing by the BMS or the computing system.

Each level of the resultant hierarchical trees may be optionally constrained or not constrained to a certain number of entities (this may be set via by updating one or more variables stored in memory, providing input to a user interface, by coding, or otherwise). In the first hierarchical result shown above, for example, only a single primary VAV box may be specified to be shown for each conference room, even though there may be more VAV boxes associated with the conference room. In an un-constrained hierarchical result, the hierarchical list for each conference room would include all related building objects.

As mentioned above, the BMS controller may be configured to use causal relationship models that may be updated during run time (e.g., by one or more control processes of the system, by user manipulation of a graphical user interface, etc.). Any modification of the causal relationship structure, in such embodiments, may be immediately reflected in applications of hierarchical models. In other words, as the building changes, the BMS controller (with or without the aid of a user) may be configured to update the causal relationship models which in turn will be reflected in the results of applying a hierarchical models to the causal relationships.

Figure 4:
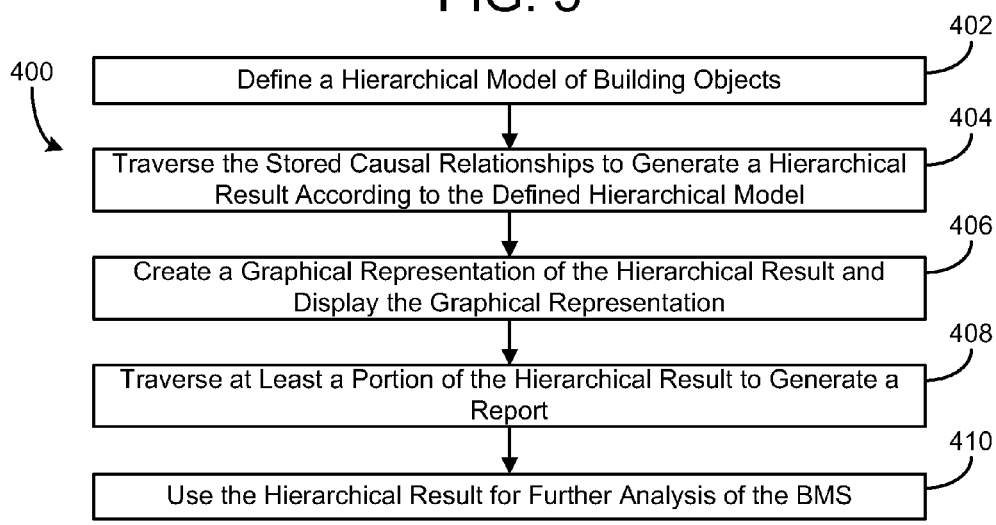
FIG. 4 is a flow diagram of a process for using a hierarchical model of the BMS, according to an exemplary embodiment.

Referring now to FIG. 4, a process 400 for using a hierarchical model of building objects is shown, according to an exemplary embodiment. Process 400 includes defining a hierarchical model of building objects (e.g., such as those shown above or otherwise formatted) (step 402). Process 400 also includes traversing the stored causal relationships to generate a hierarchical result according to the defined hierarchical model (step 404). Alternatively, the hierarchical result may be generated by querying the stored causal relationship. For example, causal relationships stored as a directed graph may be traversed to generate the hierarchical results, whereas a table storing causal relationships may be queried.

Step 404 may be conducted by one or more client applications configured to have access to the causal relationships, by a process of a server whereby only the hierarchical results are provided to client applications, by a process away from the server, or by any other process or module. Process 400 is further shown to include step 406, where the hierarchical result is used to create a graphical representation of the result for display (e.g., at a client, on a report, on a local electronic display system, etc.). A graphical user interface including a tool for allowing a user to define new hierarchical models or to revise a previously defined hierarchical model may further be provided to a user via a display system or client. In step 408 of process 400, at least a portion of the hierarchical result is traversed to generate a report. In step 410 of process 400, the hierarchical result or a group of results may be processed by one or more processing modules, reporting modules, or user interface modules for further analysis of the BMS or for any other purpose (e.g., to further format or transform the results). In an exemplary embodiment, a hierarchical result or projection of a causal relationship model can be used to find and format a rich set of data that is from the causal relationship model. In other words, a hierarchical projection of a causal relationship model can be used to query stored causal relationships.

Figure 5:
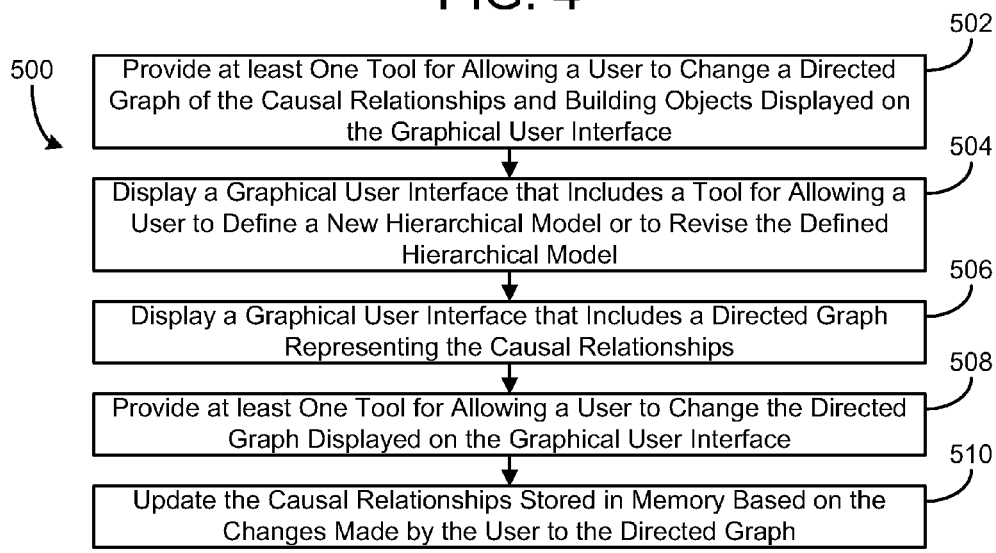
FIG. 5 is a flow diagram of a process for providing a graphical user interface for allowing users to view or interact with a causal relationship model, according to an exemplary embodiment.

Referring now to FIG. 5, a flow diagram of a process 500 to provide a graphical user interface for allowing users to view or interact with a causal relationship model is shown, according to an exemplary embodiment. Process 500 includes providing at least one tool (e.g., to a graphical user interface, as a text-based interface, etc.) for allowing a user to view or to change a directed graph of the causal relationships and building objects displayed on the graphical user interface (step 502). The tool for changing the directed graph may be the same as the tool for identifying the objects and the relationships elsewhere in the system or process, or may be a different tool for conducting revisions after an initial modeling. Process 500 also includes displaying a graphical user interface that includes a tool for allowing a user to define a new hierarchical model or to revise the hierarchical model (step 504). Process 500 further includes displaying a graphical user interface that includes a directed graph representing the causal relationships (step 506). Process 500 also includes providing at least one tool for allowing a user to change the directed graph displayed on the graphical user interface (step 508). Finally, process 500 includes updating the causal relationships stored in memory based on the changes made by the user to the directed graph (step 510).

Figure 6:
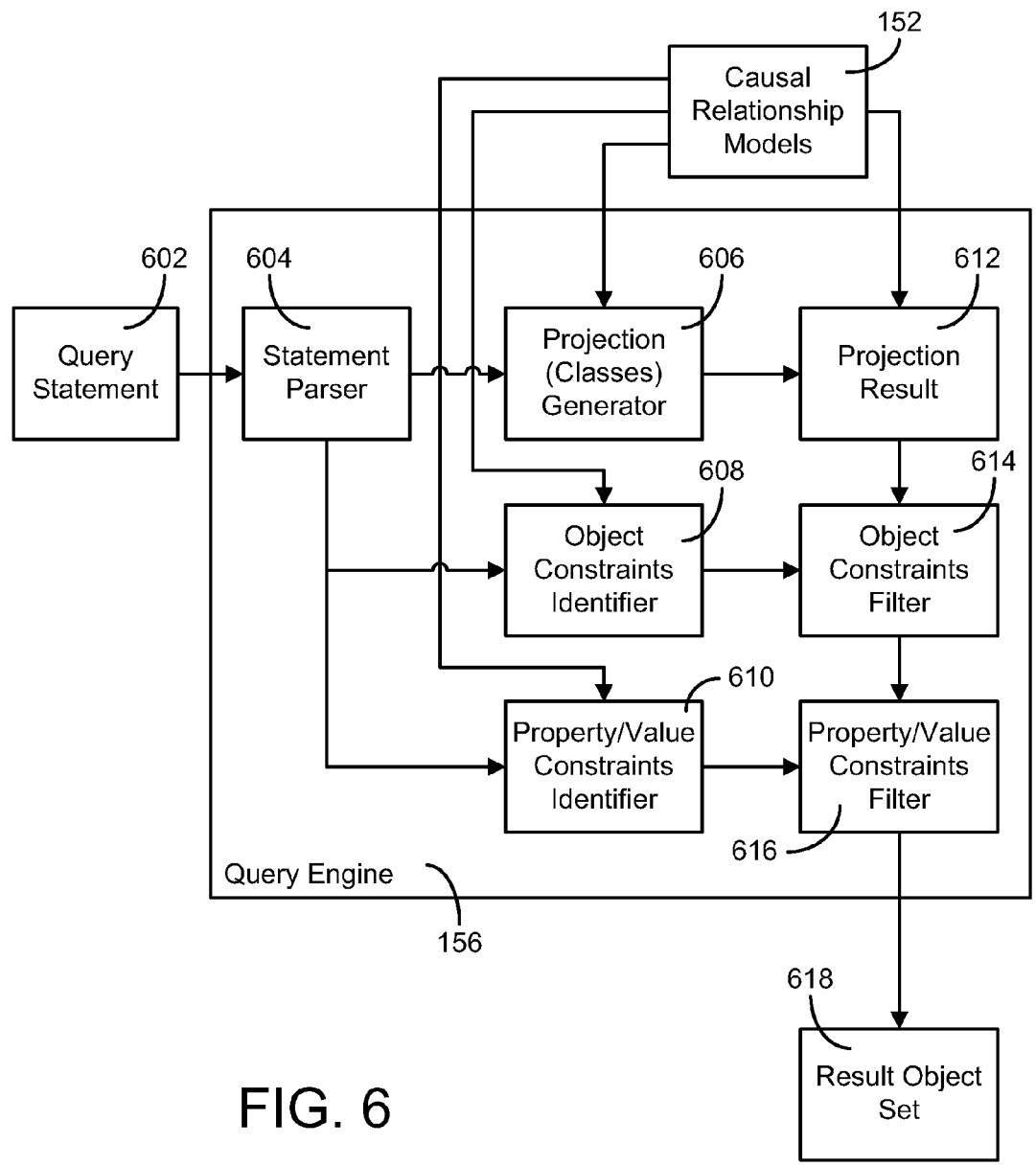
FIG. 6 is a block diagram of the query engine shown in FIGS. 1C-D, according to an exemplary embodiment.

Referring now to FIG. 6, a query engine is shown, according to an exemplary embodiment. Query engine 156 can use the causal relationship and hierarchical projection and methods described above to allow inspection (e.g., querying, searching, etc.) within the graph through structured searches. According to an exemplary embodiment, query statement 602 may be provided to query engine 156 via user interface module 144, client services 146, or application services 148. In this way, a module of the computer system, a client process, or a user via a graphical user interface or another tool (e.g., text-based query engine) may submit a structured query statement 602 to query engine 156. In some embodiments, query engine 156 resides remotely from interface module 144 and from services 146, 148 and communicates with them via middleware 14 over a network. Query engine 156 is configured to receive and parse the structured query statement 602 using statement parser 604. The parsing may seek out key words (e.g., causal relationships, object types, object names, class names, property names, property values, etc.) in query statement 602. Key words that are found may be used by projection generator 606 to construct (e.g., using a computerized process) a hierarchical model for use in conducting a search for relevant objects or for filtering the search via one or more filtering steps. In one exemplary embodiment, parsing of the statement results in: (a) an identification or generation of relevant classes via projection generator 606; (b) an identification of object constraints via object constraints identifier 608; and (c) an identification of property/value constraints via property/value constraints identifier 610. Query engine 156 applies the query aspects identified by projection generator 606, object constraints identifier 608 and property/value constraints identifier 610 to causal relationship models 152 in series to arrive at a result object set 618.

As an example of how query engine 156 operates, an example query statement is given:

"All Conference Rooms on Floor 3 of either Building 1, 2, or 3 with an an Office Temperature of Greater Than 72 Degrees"

Such a statement may be parsed by query engine 156 to:

a) Identify classes of Conference Room, Floor, and Building from the statement using projection generator 606. Using these identified keywords/classes, projection generator 606 may generate a hierarchical model that would provide a structured hierarchical tree of conference rooms, their floors, and their buildings. Query engine 156 may apply the generated hierarchical tree to the one or more causal relationship models 152 to return hierarchical projection results 612 of the conference rooms, floors and buildings, as well as particular properties and values of each object.

b) Identify the object constraints using object constraints identifier 608. Then, using the object constrains identified by object constraints identifier 608, for example, query engine 156 would use object constraints filter 614 to filter the projection results 612 to only those conference rooms with the set of object constraints requested by query statement 602 in their grouping. For example, only those conference rooms on the third floor of Buildings 1, 2, or 3 would remain in a hierarchical result set after filtering using the identified object constraints.

c) Identify the property and value constraints using property/value constraints identifier 610. Then, using the property and value constraints identified by property/value constraints identifier 610, query engine 156 would use property/value constraints filter 616 to filter the hierarchical result set to only those conference rooms with building objects whose temperature is "Greater Than 72 Degrees." After the object selection and the two filtering steps, the resultant hierarchical data set will be information and context rich for ease of processing and reporting back to the user or for action by one or more computing processes.

Other systems and methods for filtering, searching, and querying may be completed given the causal relationship models and/or hierarchical models to which the causal relationship models can be applied.

BMS query results may be presented to users in a number of different ways. Conventional graphical user interfaces (GUIs) for a BMS typically include different spreadsheets, lists, or floor plan views. However, when causal relationships and hierarchical mappings as described above exist, new views may be created that leverage the nesting and/or the object types in the search results.

Figure 7A:
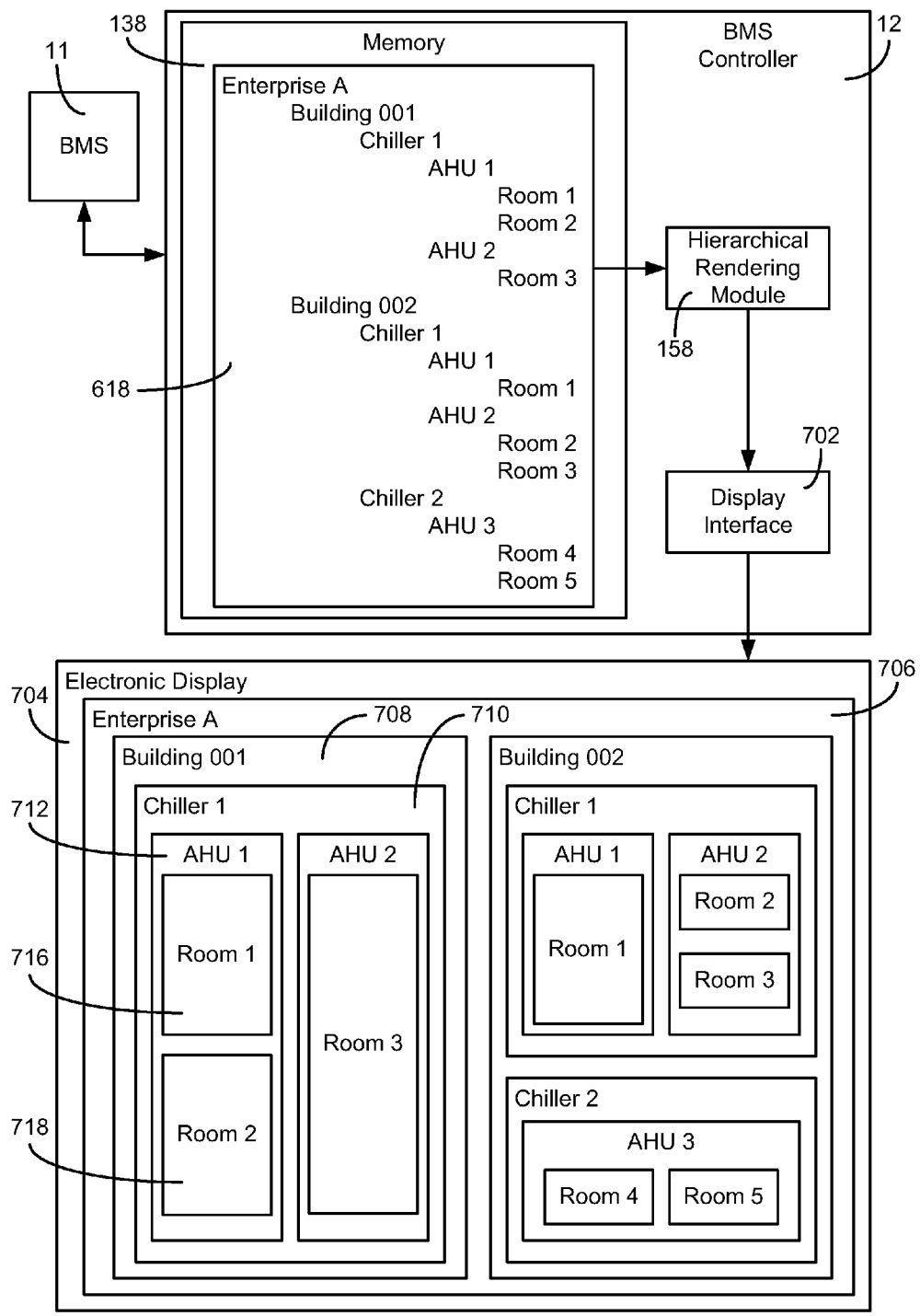
FIG. 7A illustrates system rendering hierarchical information on an electronic display is shown, according to an exemplary embodiment.

Referring now to FIG. 7A, a system for rendering hierarchical information on an electronic display is shown, according to an exemplary embodiment. Result object set 618 generated by query engine 156 is shown as existing in memory 138 of BMS controller 12. Result object set 618 contains a mapping of causal relationship models 152 and business objects 142 to a hierarchical format. For example, causal relationship models 152 (shown in FIGS. 1C and 1D) may contain relationship information such as: Room 1 "in"

Building 001 is "conditioned by" AHU1, which is "chilled by" Chiller 1 "in" Building 001 "in" Enterprise A. Query engine 156 can use this causal relationship model and hierarchy projection models 154 to generate a hierarchical result object set 618. Hierarchical rendering module 158 may use result object set 618 to produce one or more views of the result object set and may provide the views to display interface 702. Display interface 702 is configured to cause a GUI to be displayed on electronic display 704 and to display the views.

The GUI is shown to include a plurality of shapes for a plurality of software defined building objects. The software defined building objects are shown as nested according to the hierarchy of the result object set 618. The GUI may be user interactive (e.g., for viewing and changing BMS settings, configurations, setpoints, etc.) or used as a monitoring tool (e.g., the GUI may be configured to change states of any of the shapes based on alarms, alerts, or other BMS events). The GUI may be described as a "treemap" or displayed via a "treemapping" process. Aspects of each shape such as size, color, hue, shading, etc. may be correlated to changing events, values, importance or properties associated with the building objects.

In some embodiments, a user may provide preferences to the BMS via user interface module 144, UI clients 16, remote applications 18, or local applications 150 that affect how the shapes are presented on the GUI or which objects and types of information are presented on the GUI. In other embodiments, these preferences are defaulted in the BMS based on the user type (e.g., administrator, HVAC manager, security personnel, etc.). For example, the GUI may use different colors to denote faults in the BMS to an HVAC technician and use different colors to denote the life expectancy of building equipment to an asset manager. Similarly, the hierarchical rendering module 158 may be configured to show HVAC related objects as preferred (e.g., larger, located near the top of the screen, etc.).

Various shapes corresponding to the building objects in result object set 618 are shown simultaneously on electronic display 704. The size and position of the shapes corresponds to the nesting of their associated building objects in the hierarchy of result object set 618. Enterprise A 706, for example, encompasses building 708, which has chiller 710, which chills AHU 712, which conditions rooms 716, 718.

The computer system driving the displayed GUI may update the shapes to provide a dynamic or "living" scene for viewing BMS data. This approach may allow for efficient use of screen space and for many (e.g., all) relevant BMS items to be displayed on the same GUI or display screen simultaneously.

Figure 7B:
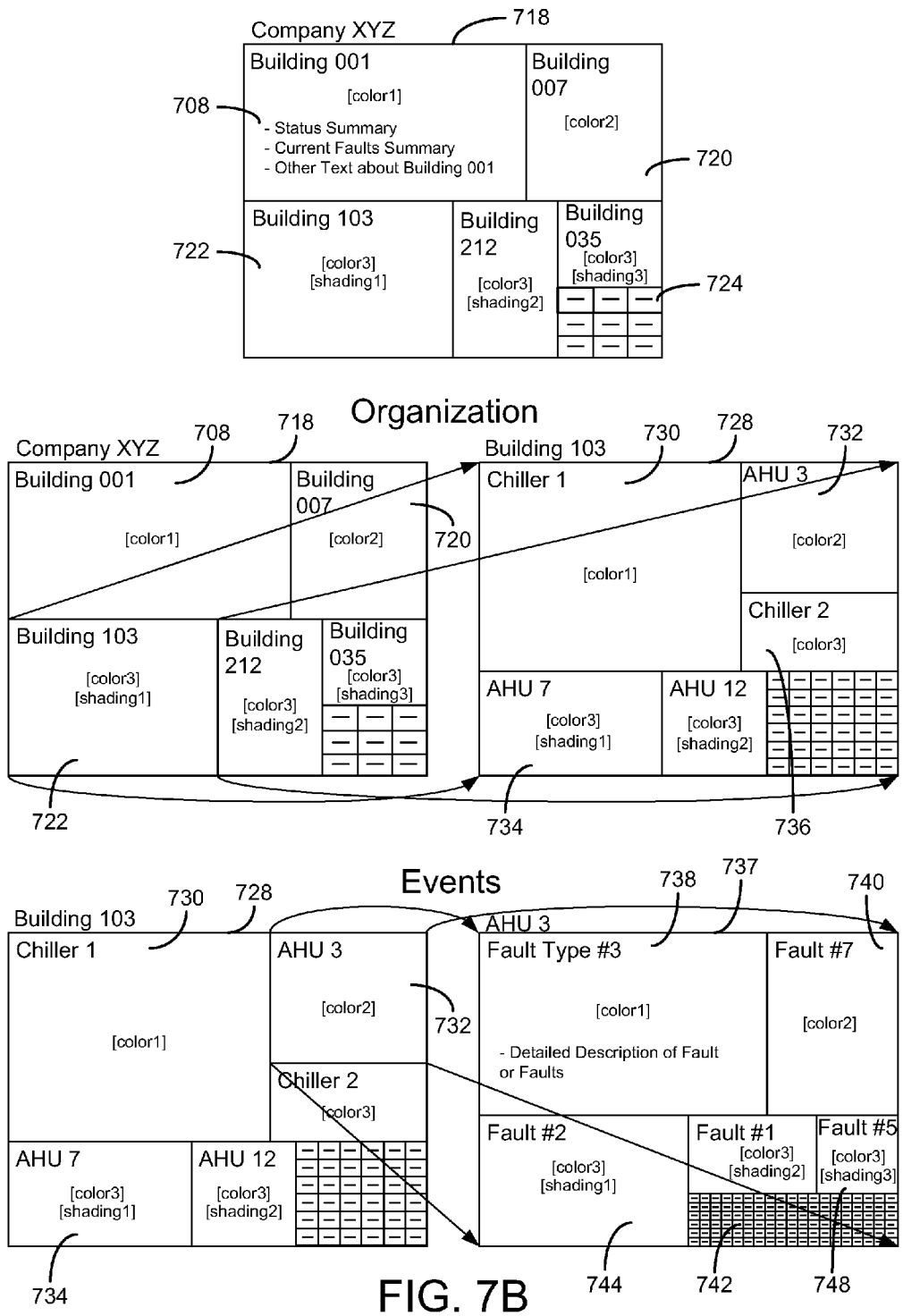
FIG. 7B illustrates exemplary graphical user interfaces rendered by the system of FIG. 7A, according to an exemplary embodiment.

Referring now to the top of FIG. 7B, hierarchical rendering module 158 may be configured to allow the shapes to change scale or position based on received user input or from received data from the BMS (e.g., events, alarms, etc.). For example, view 718 includes shape 708, i.e. "Building 001," which is shown as being larger than shape 722, i.e. "Building 103." This may correspond to a user preference or selection that places a greater emphasis on "Building 001" than "Building 103" and/or a system determination that information about "Building 001" may be of greater interest to a user. Additionally, the size of the GUI shapes can be determined by their nesting within the hierarchy itself. By varying the size of the shapes, the GUI is able to convey information to a user about the building objects, such as an order of importance. In some embodiments, larger objects may be associated with building objects having higher priority information for a user to view. As shown in FIG. 7B, text such as a status summary, fault summary, and other text about "Building 001" may be shown in the box for "Building 001." "Building 001" may be shown as the largest due to the relative importance of such information as compared to other system buildings. For example, shapes 724 have the smallest relative sizes and may denote buildings in "Company XYZ" that are of the lowest priority.

Similar to size, characteristics such as shading and color can be used in the GUI to convey information to a user about the building objects. For example, shape 708 may be colored red to denote a detected fault within "Building 001," shape 722 may be shaded yellow to denote a possible fault within "Building 103," and shapes 724 may be colored green to denote that no faults have been detected in their respective buildings. Shading variations within the same color can also be used to further convey information. For example, a light red shading may correspond to a minor fault, while a bright red shading may correspond to a critical fault. In some embodiments, the size, color and shading of the shapes are interrelated. For example, shape 708 representing "Building 001" may have the largest size and be colored red to signify that a fault exists in "Building 001." In other embodiments, the size, color and shading of the shapes are independent and each conveys different information to a user. For example, shape 708 representing "Building 001" may be of the largest size because it contains the greatest amount of building equipment, yet still be colored green to signify that the equipment is operating normally. However, shape 720 representing "Building 007" may be smaller in size than shape 708 because it has less building equipment than "Building 001," but is colored red because faults in its equipment were detected.

Referring now to the middle of FIG. 7B, the GUI may be configured to receive a user selection of a particular shape. The system may process this selection as a request from the user to "zoom in" to the selected shape and may follow the relationships of the building object associated with the shape to generate the new view. A user can click on any given shape for more detailed information about the shape or its constituents. For example, when a user selects shape 722 corresponding to "Building 103" in view 718, the system may animate (or otherwise change) the graphical user interface to expand on the contents of "Building 103" to display view 728. In the example shown, an "Organization" hierarchical projection model may be used to generate view 728 in which "Building 103" is shown as the "top level" after the change, i.e. lower level shapes 730, 732, 734, 736 shown within "Building 103" are hierarchically "beneath" or children of "Building 103." The lower level shapes 730, 732, 734, 736 also have attributes such as size, color, hue, shading, etc. that can be used to convey information about the building objects to a user. In this way, a user can navigate through the collection of building objects to gain information about the BMS by zooming in or out of the hierarchy. One or more of the shapes may include indicia (e.g., icons, graphics, graphs, maps, text, etc.) that describes the building object of the shape.

Referring now to the bottom of FIG. 7B, views 728, 737 illustrate what can occur when a user makes yet another selection in the GUI, clicking or otherwise selecting "AHU 3" shape 732 in the "Building 103" view 728. Using this process, a user or the system can trigger a "zoom in" activity into a particular building device to show a hierarchical projection model that focuses on "Events." As the levels of the hierarchy are traversed, object properties, values, and other indicia such as device faults and descriptions thereof (rather than or in addition to more objects) may be revealed by the zooming activity (e.g., faults 738, 740, 742, 744, and 748). In yet other embodiments, the entirety of the GUI may be configured to represent events, alarms, or faults with the levels being assigned by severity, urgency, on a temporal basis, or otherwise. It should be noted that different shapes, levels or types of objects or properties may be rendered as having different colors or shading.

Although FIG. 7A illustrates a hierarchical set in memory (e.g., generated based on a causal relationship model) as the data used to create the GUIs, the rendering module or other processing modules of the computer system may be configured to receive or access other BMS data to create or modify the GUIs. For example, metadata describing events or information such as duration, cost impact, energy impact, as well as statistics of the equipment such as total events or alarms may be calculated, retrieved, and/or used to create the rendered shapes or to determine and set the basic hierarchical set shown in memory of FIG. 7A.

Figure 8:
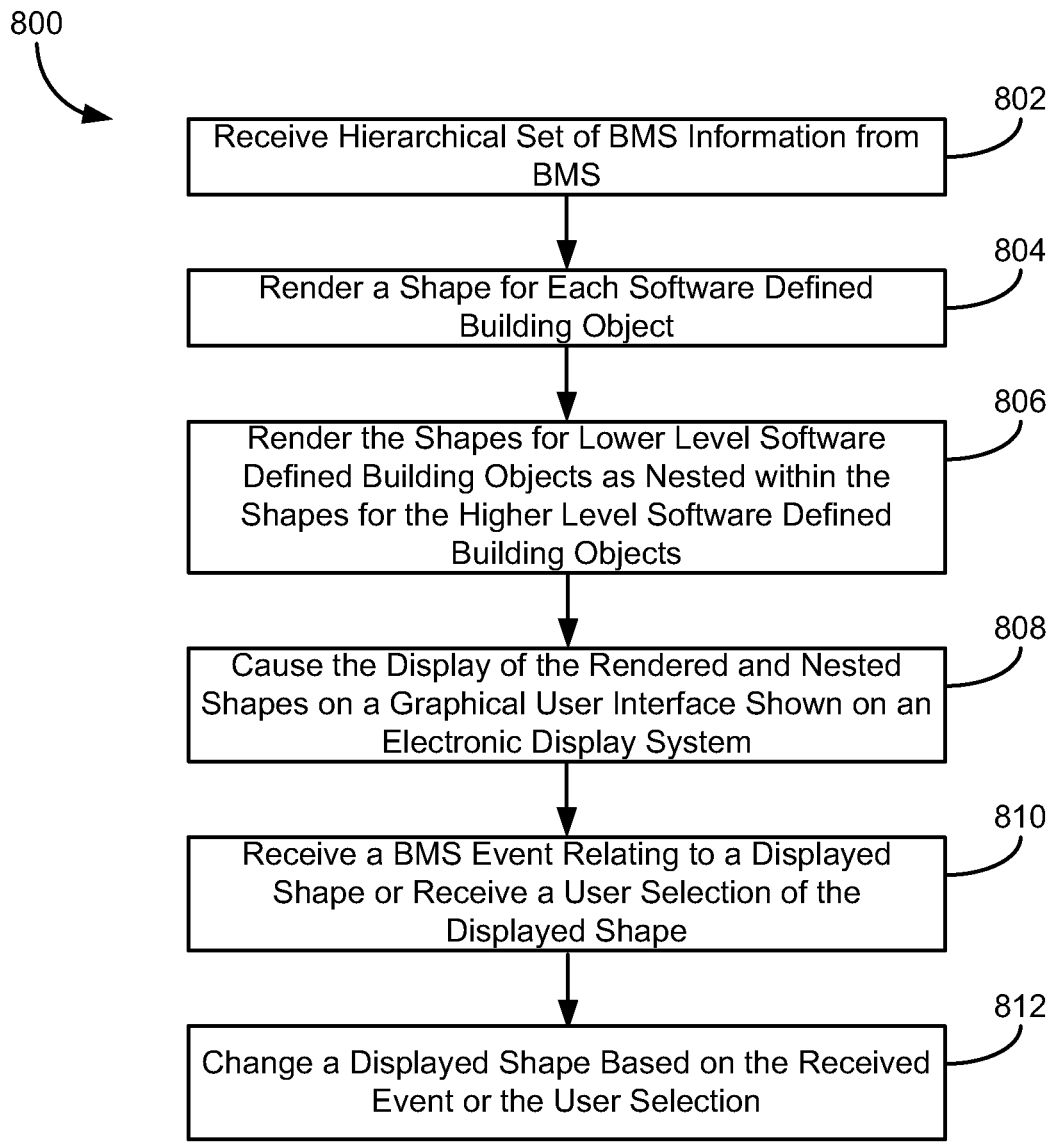
FIG. 8 is a flow chart of a computerized process for displaying a hierarchical set of building management system (BMS) information, according to an exemplary embodiment.

Referring now to FIG. 8, a flow chart of a computerized process for displaying a hierarchical set of building management system (BMS) information is shown, according to an exemplary embodiment. Process 800 is shown to include step 802, where a hierarchical set of BMS information is received from the BMS. The BMS information may be received from local memory, remote memory, or a plurality of services or locations. Each level of the hierarchical set of BMS information includes at least one software defined building object. Process 800 is also shown to include step 804, where a shape for each software defined building object is rendered. The shapes may be rectangles (as shown), near rectangles, circles, ovals, three dimensional objects, or otherwise. The rendering may occur in main memory, a video buffer, or otherwise. Process 800 further includes step 806, where the shapes for lower level software defined building objects are rendered as nested within the shapes for the higher level software defined building objects. The nesting may be determined based on a processing of the hierarchical set, processing metadata associated with each object or level, or otherwise. The processing may include calculating new parameters, aggregate values or other values. The processing to determine nesting may also include comparing the metadata, level or calculated values to thresholds or making other comparisons to determine the relative nesting of the levels or objects. Process 800 is yet further shown to include step 808, where the rendered and nested shapes are displayed on a graphical user interface shown on an electronic display system. The resultant GUI may be similar to those shown in FIG. 7A or 7B. Each shape may be displayed with indicia for the software defined building object associated with each shape. In step 810, after the display is initially rendered, the hierarchical rendering module or another processing algorithm of the computer system may receive a BMS event relating to a displayed shape or receive a user selection of a displayed shape. Process 800 may further include step 812, where a displayed shape is changed based on the received event or user selection. The change can include reorganizing the graphical user interface so that the selected shape is displayed as at least one of a higher level or a top level in the graphical user interface. The change may also or alternatively include expanding the shape to display increased information regarding the shape. Other changes may be conducted by the system in various alternative embodiments.

Figure 9:
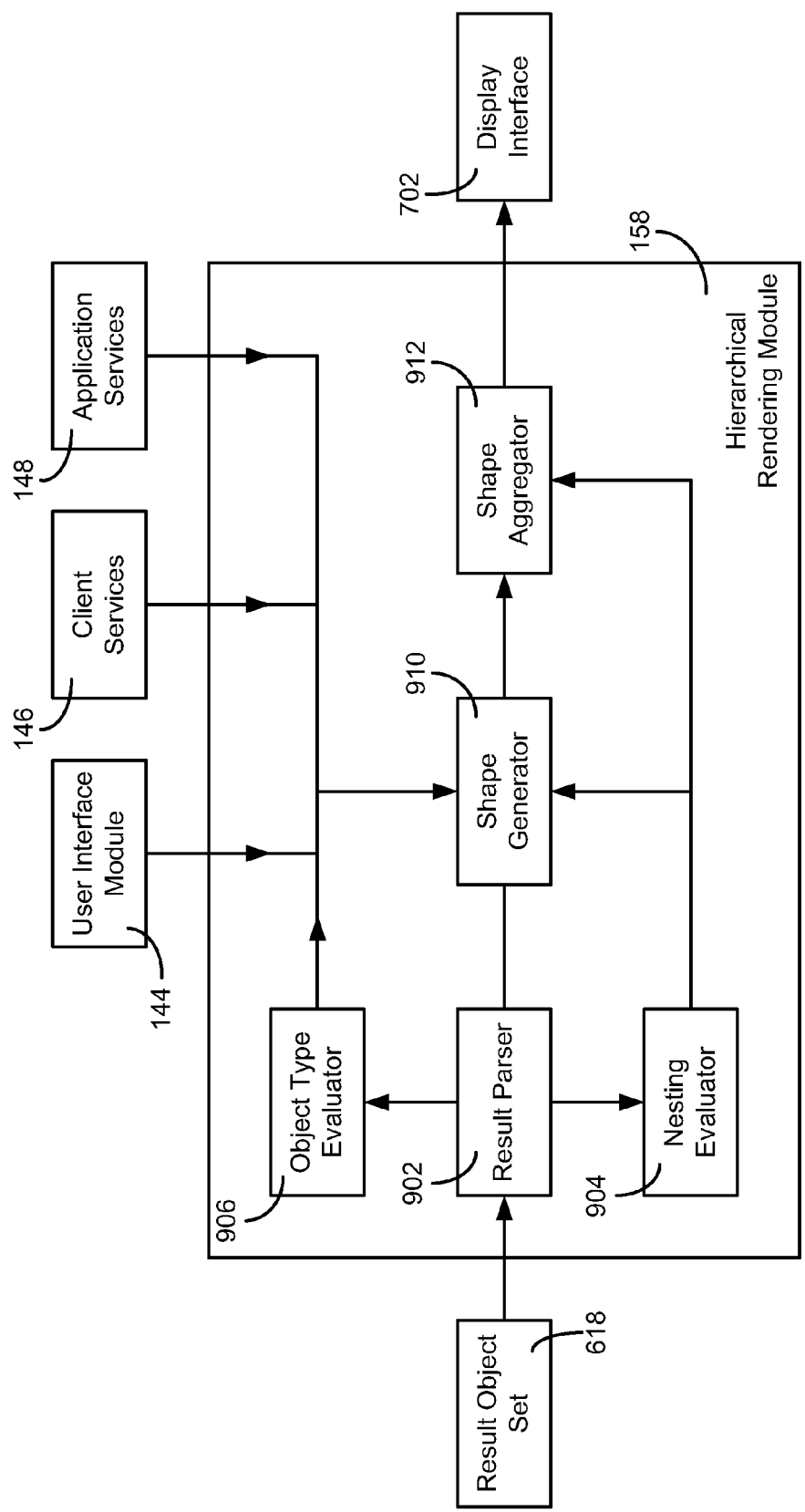
FIG. 9 is a hierarchical rendering module, according to an exemplary embodiment.

Referring now to FIG. 9, a detailed view of hierarchical rendering module 158 of FIGS. 1C and 1D is shown, according to an exemplary embodiment. Rendering module 158 receives result object set 618, which contains a hierarchical set of building objects. Result object set 618 is provided by query engine 156, user interface module 144, client services 146, application services 148, or local applications 150. Result object set 618 may also be provided by middleware 14 or another computing device in BMS 11. Result object set 618 may be provided based on the causal relationship processing discussed with reference to FIG. 6 and elsewhere in the present disclosure. Rendering module 158 uses result parser 902 to parse result object set 618 into building objects and their corresponding nestings in the hierarchy.

The building objects in result object set 618 that are identified by result parser 902 are evaluated by object type evaluator 906. Object type evaluator 906 generates one or more criteria for the appearance of an object when it is displayed. For example, an alarm object may have a different size, color or shape when it is presented via a display device. Object type evaluator 906 is also able to utilize information from the BMS, based on the type of building object. For example, object type evaluator 906 may utilize information from user interface module 144, client services 146, application services 148 and/or other components of the BMS to generate recommended characteristics for the object's graphical representation. By way of example, a user may provide an indication via user interface module 144 that more information about a particular object is desired or that certain types of objects should be given specific characteristics on the display.

Hierarchical rendering module 158 is also shown to include nesting evaluator 904, which receives the nestings in result object set 618 identified by result parser 902. Similar to object type evaluator 906, nesting evaluator 904 generates one or more characteristics for the building objects, such as size, color, shading, text, etc. based on their nesting within the hierarchy. For example, an AHU nested deeply in the hierarchy may be associated with a smaller shape, while a building nested near the top of the hierarchy may be associated with a larger shape.

Hierarchical rendering module 158 may also use additional information (e.g. data from user interface module 144, client services 146, and/or application services 148) to generate characteristics for the building objects. For example, a user preference from user interface module 144 may specify that objects of a certain type are displayed using large shapes with bright colors and shadings. In another embodiment, the object types evaluated by object type evaluator 906 and/or nestings evaluated by nesting evaluator 904 can drive queries to the BMS for additional information about the objects. This information can then be incorporated into the rendering of the objects as shapes. For example, an object representing a physical building may trigger hierarchical rendering module 158 to retrieve information about the building (e.g., a status summary, a current fault summary, or other information about the building). This information may be used to determine the size, color, shading, etc. of the object's shape, or may be presented as text within the shape itself.

Characteristics for the building objects generated by object type evaluator 906, nesting evaluator 904, user interface module 144, client services 146, and/or application services 148 are collected by shape generator 910 to finalize the appearance of the shapes. Shape generator 910 may also use an order of priority in generating the shapes. For example, a user preference from user interface module 144 may specify that VAV box fault alarms are to be given smaller sizes, even though object type evaluator 906 determines that faults are to be given larger sizes. In that case, the user preference may be given priority and the corresponding shape given a smaller size.

Hierarchical rendering module 158 is further shown to include shape aggregator 912, which aggregates the shapes generated by shape generator 910 into one or more views. Shape aggregator 912 may also be configured to resize the shapes to fit views having specific dimensions (e.g., different display sizes), while retaining the relative sizes of the shapes to one another. Generated views are then provided by shape aggregator 912 to display interface 702 for presentation on an electronic display.

Figure 10:
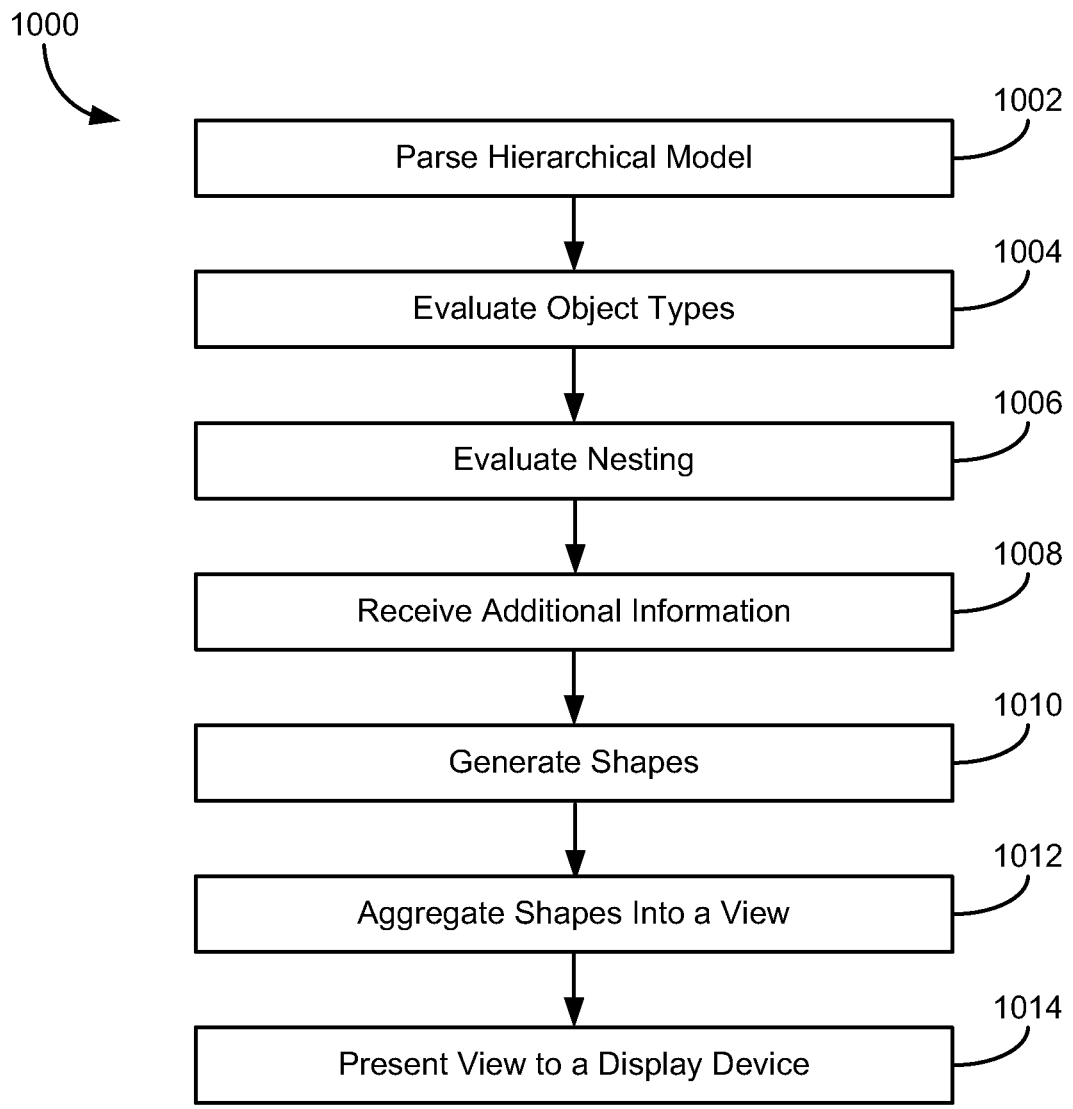
FIG. 10 is a flow chart of process for rendering a hierarchical set of BMS information, according to an exemplary embodiment.

Referring now to FIG. 10, a flow chart of process for rendering a hierarchical set of BMS information is shown, according to an exemplary embodiment. Process 1000 is shown to include the step of parsing a hierarchical model (step 1002). In step 1002, the hierarchical model is parsed to determine its constituent objects and their respective nestings. Process 1000 is also shown to include the step of evaluating the object types (step 1004). The object types in the hierarchy can be used to generate characteristics for their visual representation in a GUI. For example, a shape corresponding to an alarm object type may have a red color, by default. Process 1000 is further shown to include the step of evaluating the nesting of the objects (step 1006). Similar to the object types, the nesting of the objects within the hierarchy can be used to generate characteristics for their visual representation in a GUI. For example, higher level objects in the hierarchy may be given larger shapes than deeper nested objects.

Process 1000 is yet further shown to include receiving additional information (step 1008). Additional information from a user or from the BMS itself can be used to further define how the building objects are rendered. For example, a user preference may specify that objects of a certain type are displayed using large shapes with bright colors and shadings. In another embodiment, the object types evaluated in step 1004 and/or nestings evaluated in step 1006 can drive queries to the BMS for additional information about the objects. This information can then be incorporated into the rendering of the objects as shapes. For example, an object representing a physical building may trigger the BMS to retrieve information about the building (e.g., a status summary, a current fault summary, or other information about the building). This information may be used to determine the size, color, shading, etc. of the object's shape, or may be presented as text within the shape itself.

Process 1000 is also shown to include the step of generating shapes (step 1010). In step 1010, the characteristics of the shapes that were determined in steps 1004, 1006, and/or 1008 are used to determine the final appearance of the shapes. An order of preference may also be used to distinguish among conflicting characteristics. For example, a user preference to display all HVAC related objects using large shapes may override a determination in step 1006 that the nesting of an AHU corresponds to a small shape. Process 1000 further includes the step of aggregating the shapes into a view (step 1012). In one embodiment, the layout of the shapes is determined by the BMS or by a user. For example, a user may specify that all alarm shapes should be placed in the top left corner of a view. In another embodiment, the sizes of the shapes are adjusted in step 1010 to fit a view of a certain size. Process 1000 finally includes the step of presenting the view to a display device (step 1014).

The construction and arrangement of the systems and methods as shown in the various exemplary embodiments are illustrative only. Although only a few embodiments have been described in detail in this application, many modifications are possible. For example, the position of elements may be varied and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present application.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present application include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Software implementations could be accomplished with standard programming techniques with rule based logic and other logic to accomplish the various connection steps, processing steps, comparison steps and decision steps.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A computerized method for graphically displaying a non-graphical hierarchical set of information from a building management system (BMS) information, the method comprising:
   receiving a causal relationship model that defines directional causal relationships between a plurality of software defined building objects;
   using the causal relationship model to generate a non-graphical hierarchical set of BMS information having multiple hierarchical levels, wherein each level of the non-graphical hierarchical set of BMS information includes at least one of the software defined building objects hierarchically arranged according to the directional causal relationships defined by the causal relationship model, wherein at least one of the software defined building objects is a lower level software defined building object which has an attribute mapped to an input from a sensory device of the building management system, wherein the input is based on a variable measured by the sensory device, and wherein another of the software defined building objects is a higher level software defined building object representing building equipment configured to affect the measured attribute of the lower level software defined building object, as defined by the causal relationship model, by operating the building equipment;

processing the non-graphical hierarchical set of BMS information to determine and render a graphical shape for each of the software defined building objects, wherein the shapes for lower level software defined building objects are rendered as nested within the shapes for higher level software defined building objects; and causing display of the rendered and nested shapes on a graphical user interface shown on an electronic display system, wherein each shape is displayed with indicia for the software defined building object associated with each shape and wherein the display of a shape for a higher level software defined building object concurrently displays a hierarchically nested shape for a lower level software defined building object at each lower level of the hierarchical set.

2. The method of claim 1, wherein the hierarchical BMS information includes at least one of event or alarm information for a building.

3. The method of claim 1, wherein at least one of the software defined building objects includes inputs mapped from a plurality of BMS subsystems.

4. The method of claim 1, wherein the shapes are at least one of sized, shaded, colored, and outlined to represent each shape's level in the hierarchical set of BMS information.

5. The method of claim 1, wherein the shapes are at least one of sized, shaded, colored, and outlined to represent the type of building object associated with the shape.

6. The method of claim 1, wherein the shapes are at least one of sized, shaded, colored, and outlined to represent the importance of information associated with the software defined building object.

7. The method of claim 1, wherein the shape are at least one of sized, shaded, colored, and outlined to represent the urgency of an event or alarm associated with the software defined building object.

8. The method of claim 1, wherein the shape are at least one of sized, shaded, colored, and outlined to represent a number of faults associated with the software defined building object.

9. The method of claim 1, further comprising using a processing algorithm to change a shape displayed in the graphical user interface in response to and representing a detected change in the hierarchical set of BMS information.

10. The method of claim 9, wherein the processing algorithm is configured to conduct the change based on at least one of a user selection and receiving a new event from the BMS associated with the software defined building object for the shape.

11. The method of claim 10, wherein the change comprises reorganizing the graphical user interface so that the selected shape is displayed as at least one of a higher level or a top level in the graphical user interface.

12. A computer system for displaying a hierarchical set of information from a building management system (BMS), the computer system comprising:

a processing circuit configured to:
receive a causal relationship model that defines directional causal relationships between a plurality of software defined building objects;

use the causal relationship model to generate a non-graphical hierarchical set of BMS information having multiple hierarchical levels, wherein each level of the non-graphical hierarchical set of BMS information includes at least one of the software defined building objects hierarchically arranged according to the directional causal relationships defined by the causal relationship model, wherein at least one of the software defined building objects is a lower level software defined building object which has an attribute mapped to an input from a sensory device of the building management system, wherein the input is based on a variable measured by the sensory device, and wherein another of the software defined building objects is a higher level software defined building object representing building equipment configured to affect the measured attribute of the lower level software defined building object, as defined by the causal relationship model, by operating the building equipment;

process the non-graphical hierarchical set of BMS information to determine and render a graphical shape for each of the software defined building objects, wherein the shapes for lower level software defined building objects are rendered as nested within the shapes for higher level software defined building objects; and cause display of the rendered and nested shapes on a graphical user interface shown on an electronic display system, wherein the display of a shape for a higher level software defined building object concurrently displays a hierarchically nested shape for a lower level software defined building object at each lower level of the hierarchical set.

13. The computer system of claim 12, wherein each shape is displayed with indicia for the software defined building object associated with each shape.

14. The computer system of claim 12, wherein the hierarchical BMS information includes at least one of event or alarm information for a building.

15. The computer system of claim 12, wherein the processing circuit is configured to change a shape displayed in the graphical user interface in response to and representing a detected change in the hierarchical set of BMS information.

16. The computer system of claim 15, wherein the processing circuit is configured to conduct the change based on at least one of a user selection and receiving a new event from the BMS associated with the software defined building object for the shape, wherein the change comprises at least one of:

reorganizing the graphical user interface so that the selected shape is displayed as at least one of a higher level or a top level in the graphical user interface; and expanding the shape to display increased information regarding the shape.

17. Computer-readable media with computer-executable instructions embodied thereon that when executed by a computing system perform a method for displaying a hierarchical set of information from a building management system (BMS), wherein each level of the hierarchical set of BMS information includes at least one software defined building object, the media comprising:

instructions for receiving a causal relationship model that defines directional causal relationships between a plurality of software defined building objects instructions for using the causal relationship model to generate a non-graphical hierarchical set of BMS information having multiple hierarchical levels, wherein each level of the non-graphical hierarchical set of BMS information includes at least one of the software defined building objects hierarchically arranged according to the directional causal relationships defined by the causal relationship model, wherein at least one of the software defined building objects is a lower level software defined building object which has an attribute mapped to an input from a sensory device of the building management system, wherein the input is based on a variable measured by the sensory device, and wherein another of the software defined building objects is a higher level software defined building object representing building equipment configured to affect the measured attribute of the lower level software defined building object, as defined by the causal relationship model, by operating the building equipment;

instructions for processing the non-graphical hierarchical set of BMS information to determine and render a graphical shape for each of the software defined building objects;

instructions for rendering the shapes for lower level software defined building objects as nested within the shapes for higher level software defined building objects; and instructions for causing display of the rendered and nested shapes on a graphical user interface shown on an electronic display system, wherein each shape is displayed with indicia for the software defined building object associated with each shape and wherein the display of a shape for a higher level software defined building object concurrently displays a hierarchically nested shape for a lower level software defined building object at each lower level of the hierarchical set.

* * * * *